(12) United States Patent
Evraets et al.

(10) Patent No.: US 7,985,496 B2
(45) Date of Patent: Jul. 26, 2011

(54) SIDE TERMINAL AND INSERT, METHOD AND APPARATUS FOR MANUFACTURING SAME

(75) Inventors: Terry J. Evraets, West Bend, WI (US); Bernard N. Spiegelberg, Germantown, WI (US)

(73) Assignee: Tulip Corporation, Milwaukee, WI (US)

( * ) Notice: Subject to any disclaimer, the term of this patent is extended or adjusted under 35 U.S.C. 154(b) by 1034 days.

(21) Appl. No.: 11/828,171

(22) Filed: Jul. 25, 2007

(65) Prior Publication Data
US 2009/0029247 A1   Jan. 29, 2009

(51) Int. Cl.
*H01M 2/20*   (2006.01)

(52) U.S. Cl. ............................ 429/122; 429/179; 29/874
(58) Field of Classification Search .................. 429/122, 429/179; 29/874
See application file for complete search history.

(56) References Cited

U.S. PATENT DOCUMENTS

| 5,422,202 A | 6/1995 | Spiegelberg et al. |
| 5,425,170 A | 6/1995 | Spiegelberg et al. |
| 5,589,294 A | 12/1996 | Spiegelberg et al. |

*Primary Examiner* — Jane Rhee
(74) *Attorney, Agent, or Firm* — Rathe Lindenbaum

(57) ABSTRACT

A cold formed battery terminal and a method for forming the like having a body defining a cavity and an insert formed of a material different than the body confined in the cavity. The insert includes an insert base, at least one side wall, and at least one flange extending radially outward from the side wall.

28 Claims, 27 Drawing Sheets

FIGURE 2
FIG 2B
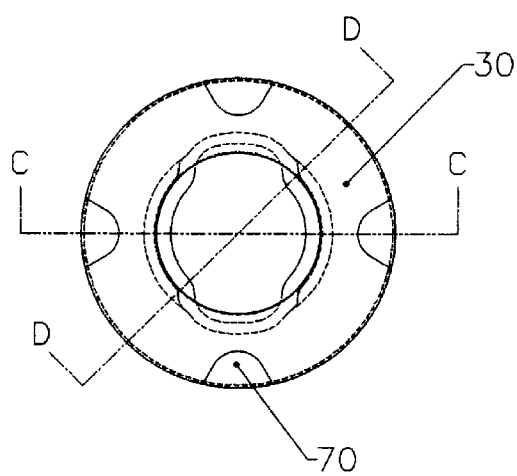
FIG 2A
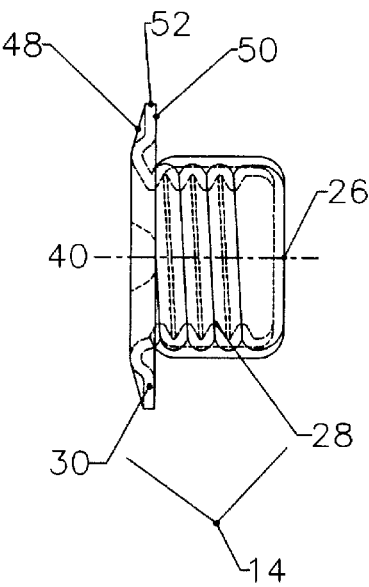
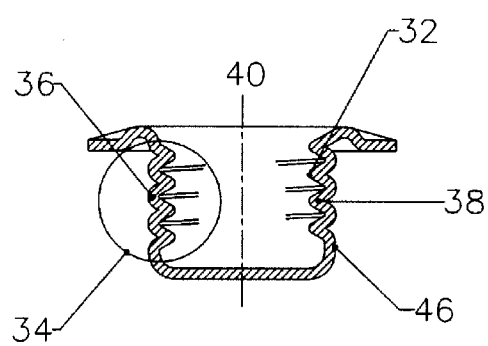
SECTION C-C
FIG 2C
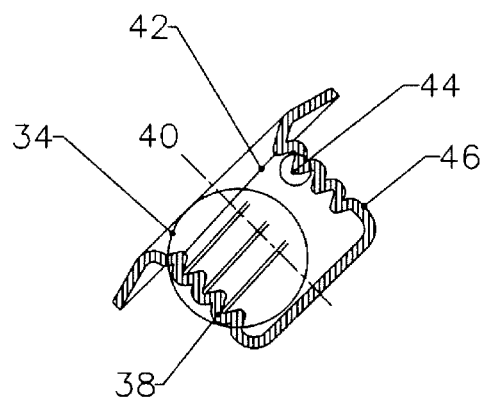
SECTION D-D
FIG 2D

US 7,985,496 B2

SIDE TERMINAL AND INSERT, METHOD AND APPARATUS FOR MANUFACTURING SAME

CROSS-REFERENCE TO RELATED PATENT APPLICATIONS

Background of the Invention

The present invention relates generally to the field of battery terminals for automobiles and the like. Battery terminals can be mounted on the top or the side of a battery. The battery terminals provide a means to quickly connect the battery to the vehicle cable.

SUMMARY OF THE INVENTION

The present invention features a battery terminal having an insert and method for forming the like. One embodiment of the invention relates to a cold formed side wall battery terminal. The battery terminal comprises a body defining a cavity having a cavity bottom at one end and an insert formed of a material different than the body positioned in the cavity. The insert includes a base proximate the cavity bottom, at least one side wall, having an inside surface, that extends into the cavity from the base, and at least one flange that extends radially outward from the side wall. The flange of the insert is confined by the body along an upper surface, a bottom surface, and an outer edge of the flange.

A second embodiment of the invention relates to a method for cold forming the battery terminal and confining an insert therein. A body is cold formed such that the cavity has a lower cavity portion and an upper cavity portion. The upper cavity portion has a diameter greater than the diameter of the lower cavity portion. A ledge is formed where the two cavity portions meet. The ledge has a top surface. A band of body material about the upper portion of the cavity is also formed at this time. The insert is then provided. The insert is formed of a material different than the body. The insert includes a base, at least one side wall that extends upward, and at least one flange that extends radially outward from the side wall. The insert is positioned into the cavity such that the flange is proximate the top surface of the ledge and the insert base is proximate the cavity bottom. The band of body material is cold formed such that it confines the flange of the insert within the body along an upper surface, a bottom surface, and an outer edge. A layer, or top tier, of body material is then about the flange.

BRIEF DESCRIPTION OF THE DRAWINGS

FIG. 2(a) is a schematic representation of a side view of the outer surface of a threaded insert according to an exemplary embodiment.

FIG. 2(b) is a schematic representation of a top view of a threaded insert according to an exemplary embodiment.

FIG. 2(c) is a cross-sectional view of the threaded insert in FIG. 2(b) along line C-C according to an exemplary embodiment.

FIG. 2(d) is a cross-sectional view of the threaded insert in FIG. 2(b) along line D-D according to an exemplary embodiment.

DETAILED DESCRIPTION OF THE PREFERRED EMBODIMENTS

Figure 1A:
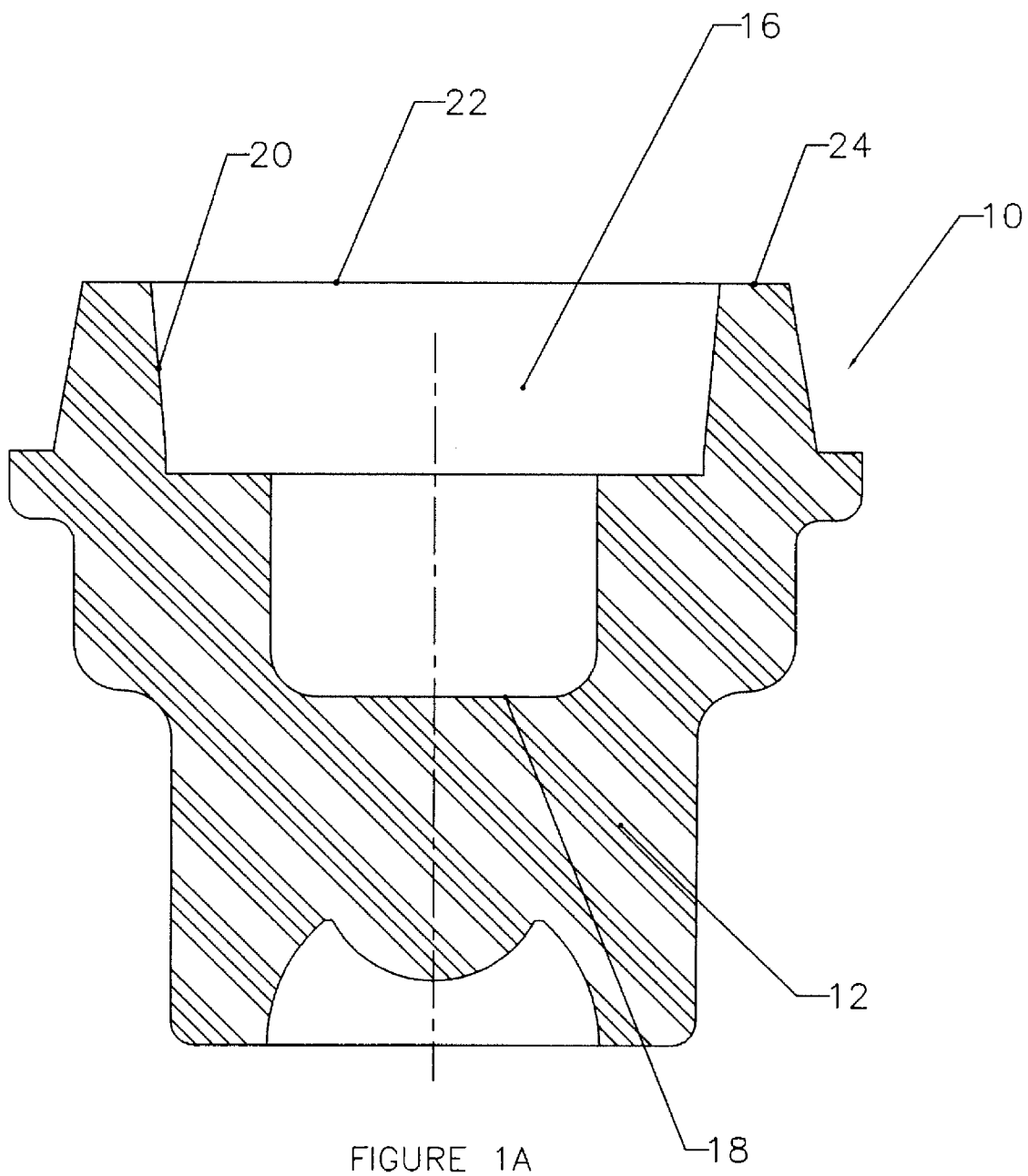
FIG. 1(a) is a schematic representation of a section view of the body of the battery terminal before the insert is confined according to an exemplary embodiment.
Figure 1B:
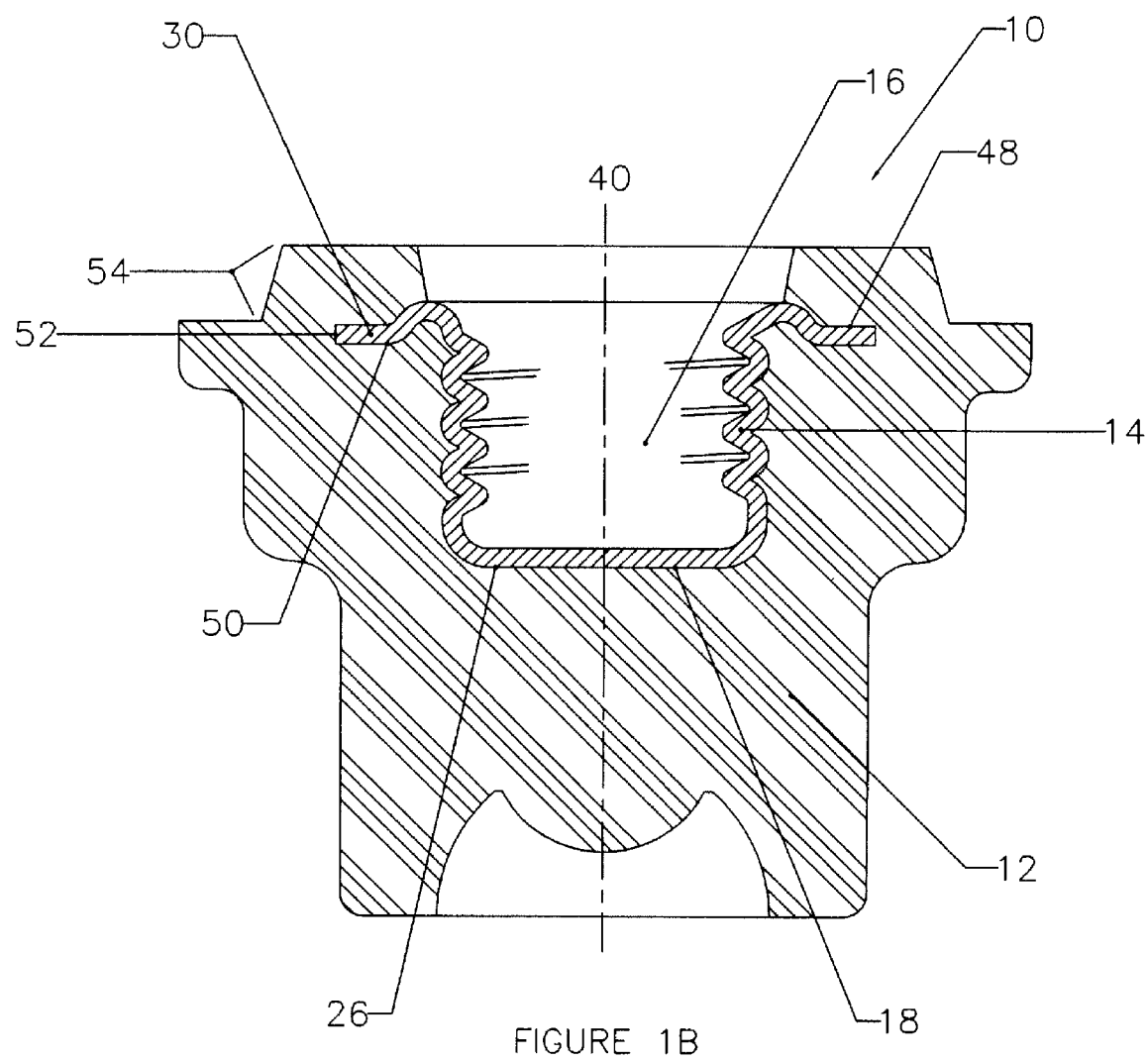
FIG. 1(b) is a schematic representation of a section view of the battery terminal with threaded insert according to an exemplary embodiment.
Figure 3A:
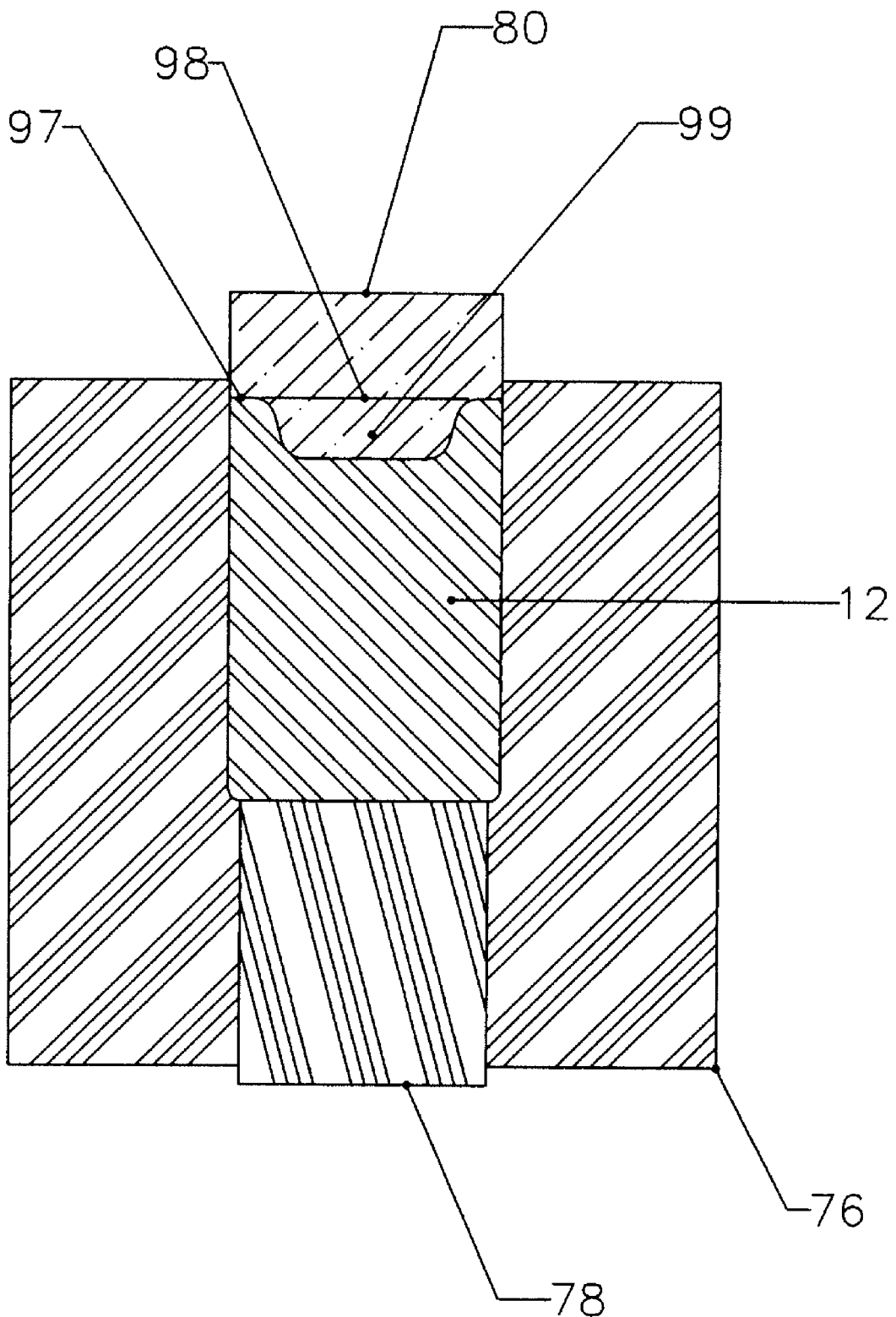
FIG. 3(a) is a cross-sectional view of the battery terminal after the first forming station.
Figure 3B:
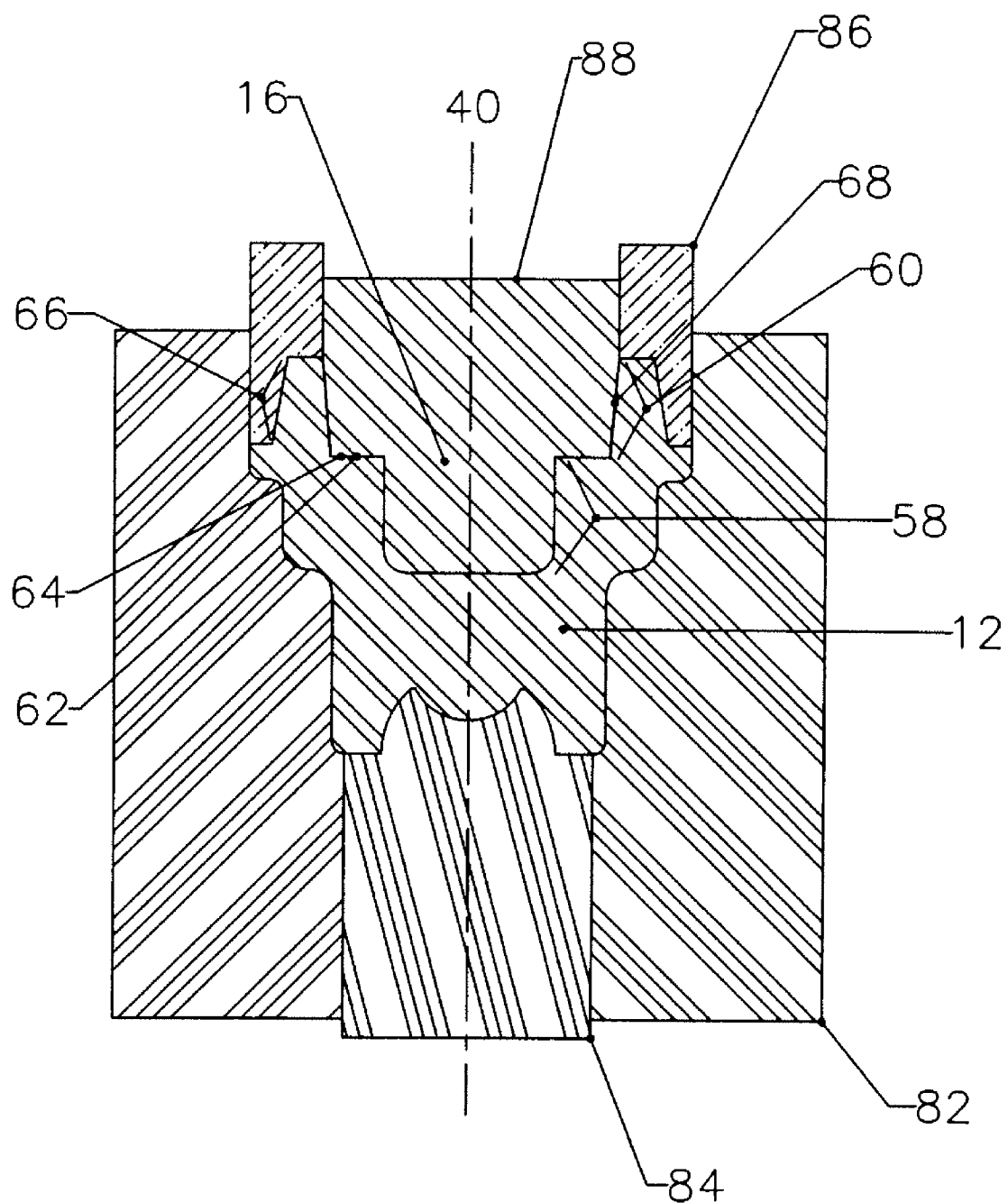
FIG. 3(b) is a cross-sectional view of the battery terminal after the second forming station.
Figure 3C:
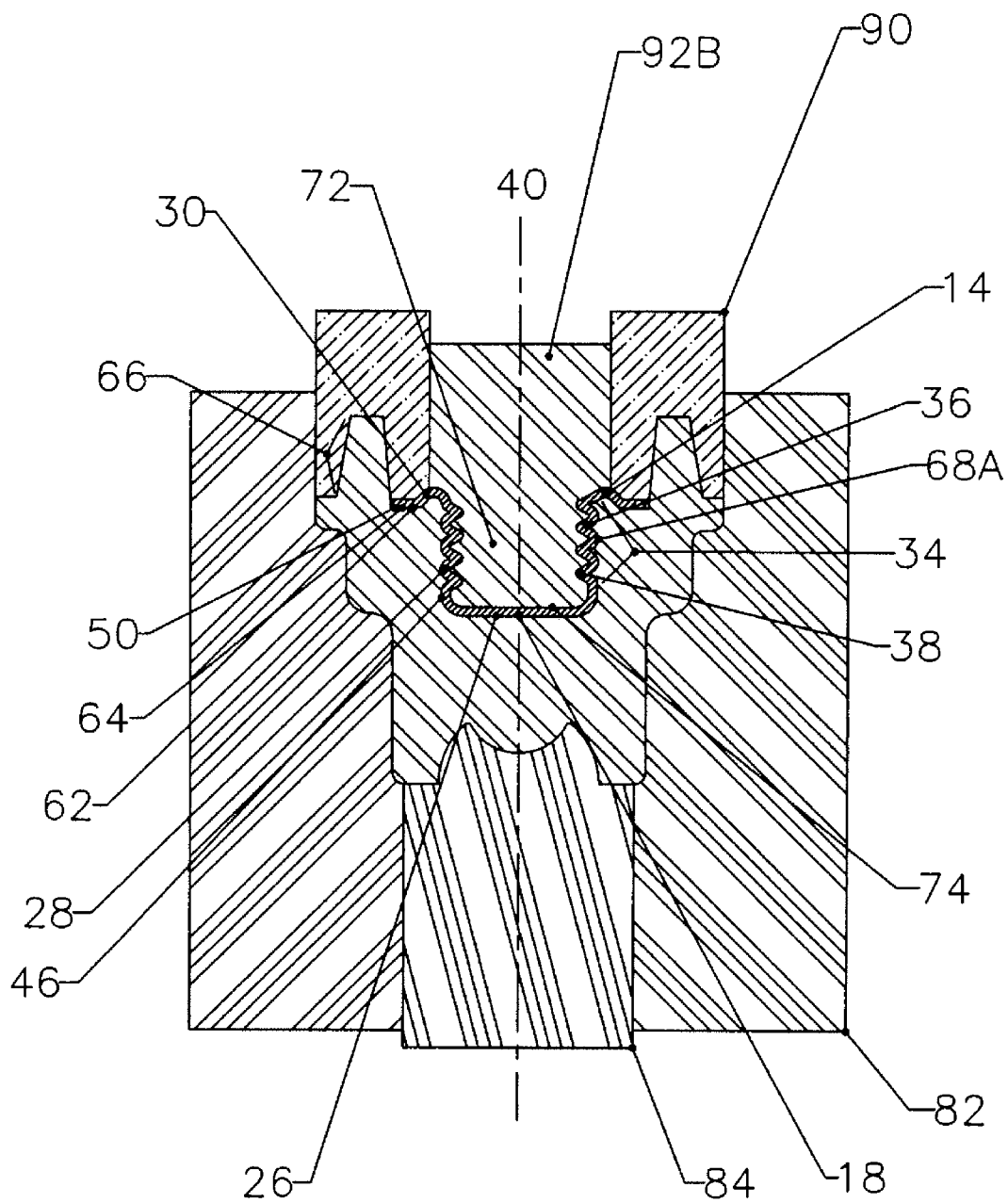
FIG. 3(c) is a cross-sectional view of the battery terminal after the insert has been inserted at the third forming station.
Figure 3D:
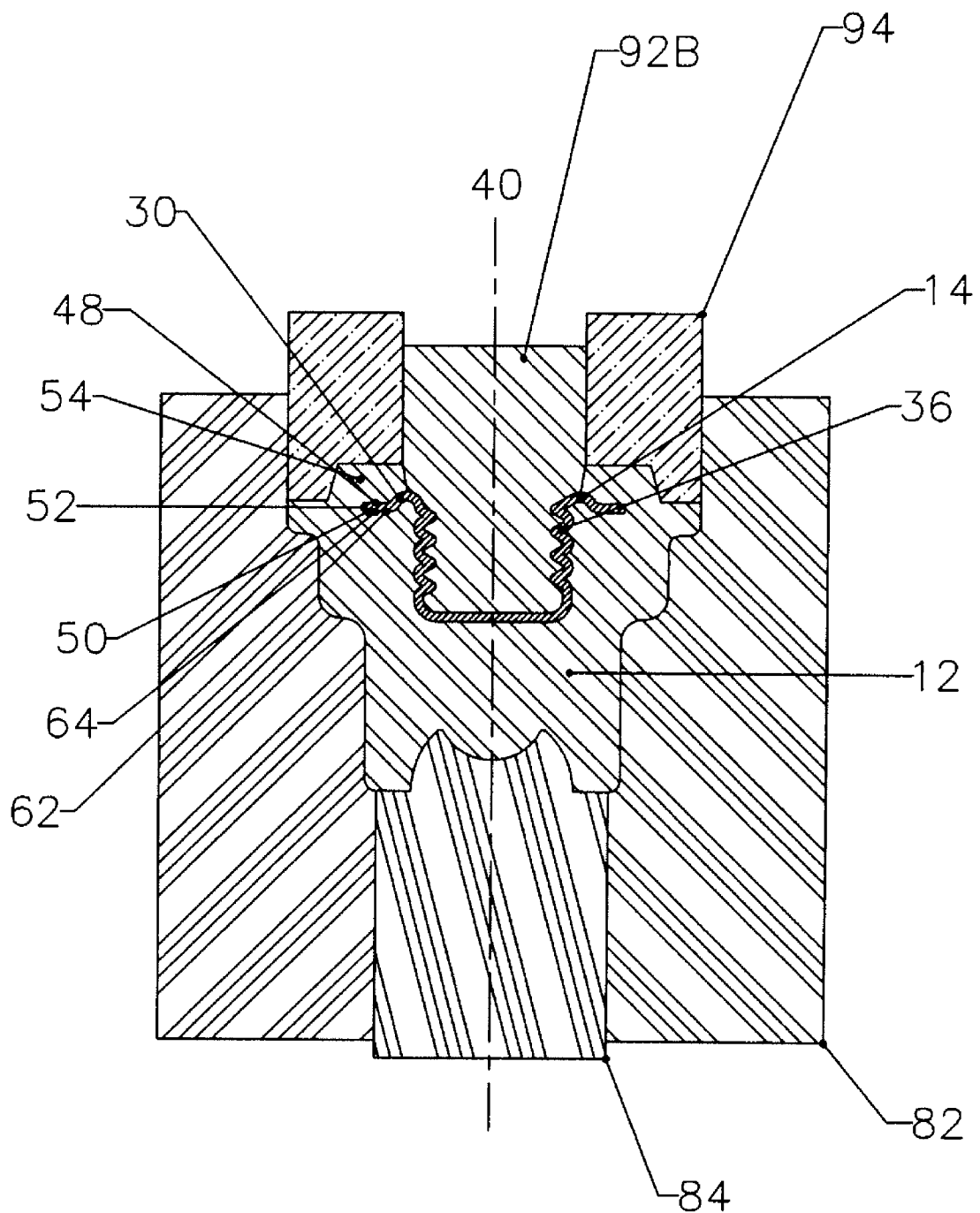
FIG. 3(d) is a cross-sectional view of the battery terminal after the body has been cold formed to confine the insert.
Figure 4A:
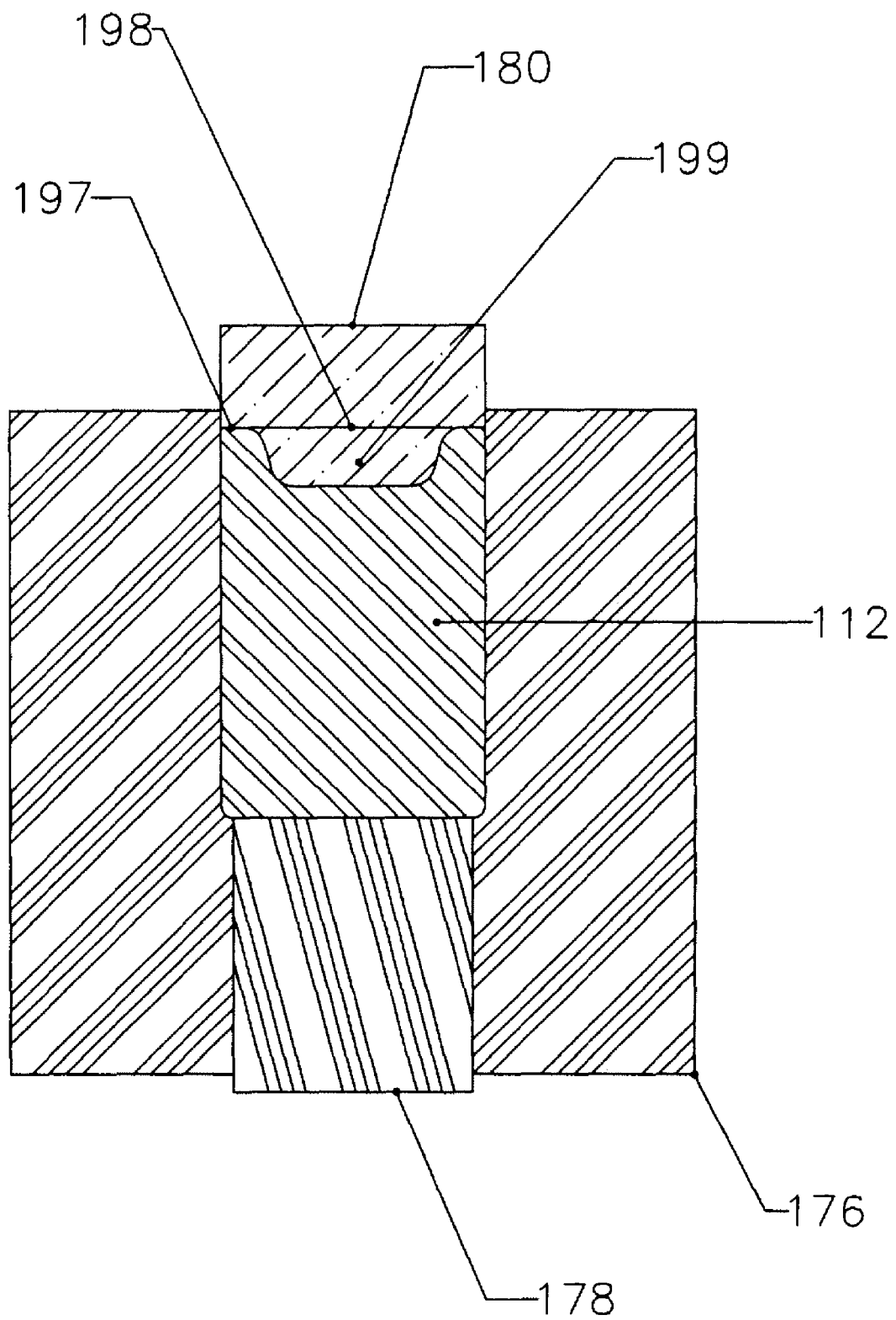
FIG. 4(a) is a cross-sectional view of the battery terminal after the first forming station.
Figure 4B:
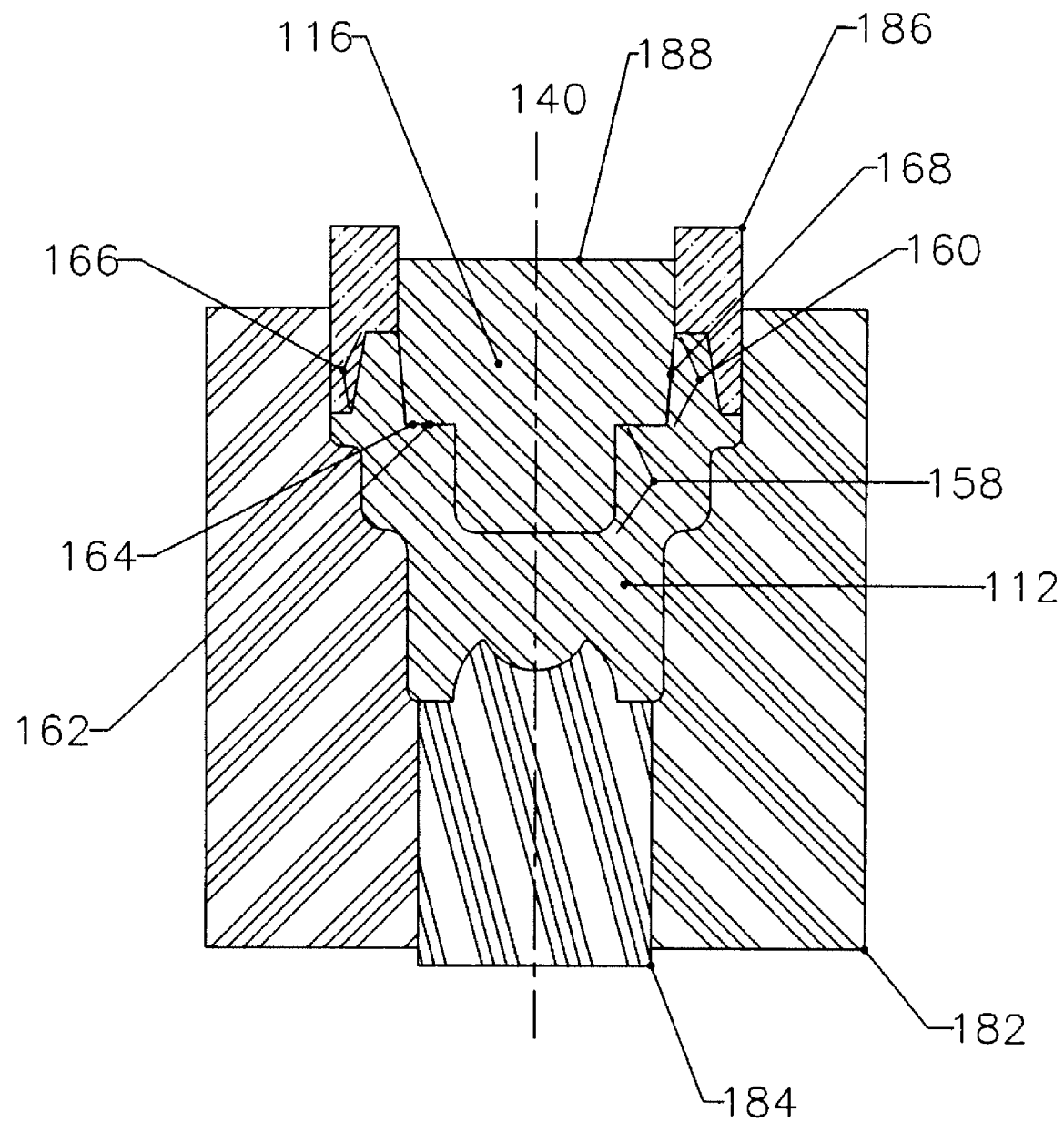
FIG. 4(b) is a cross-sectional view of the battery terminal after the second forming station.
Figure 4C:
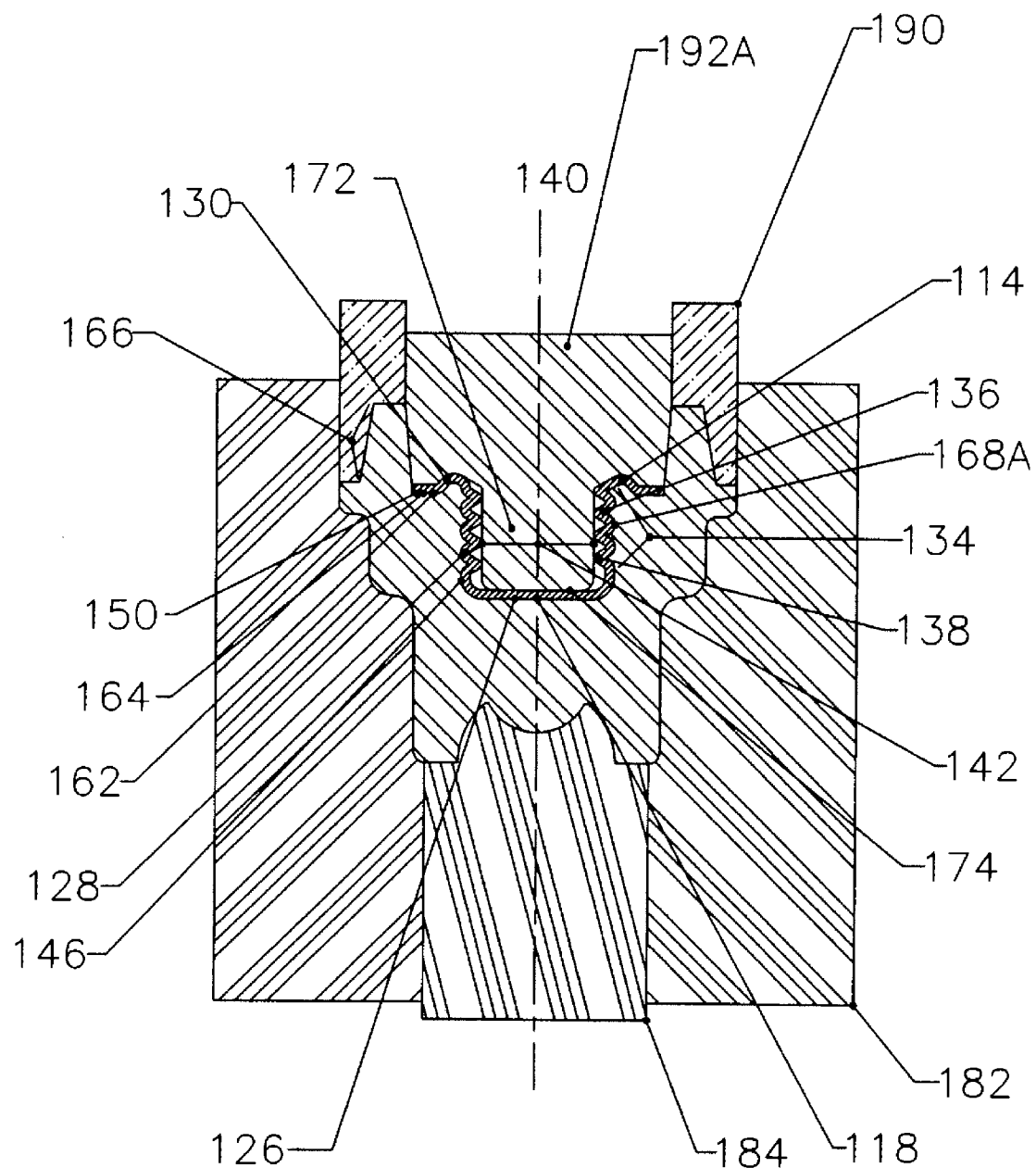
FIG. 4(c) is a cross-sectional view of the battery terminal after the insert has been inserted at the third forming station.
Figure 4D:
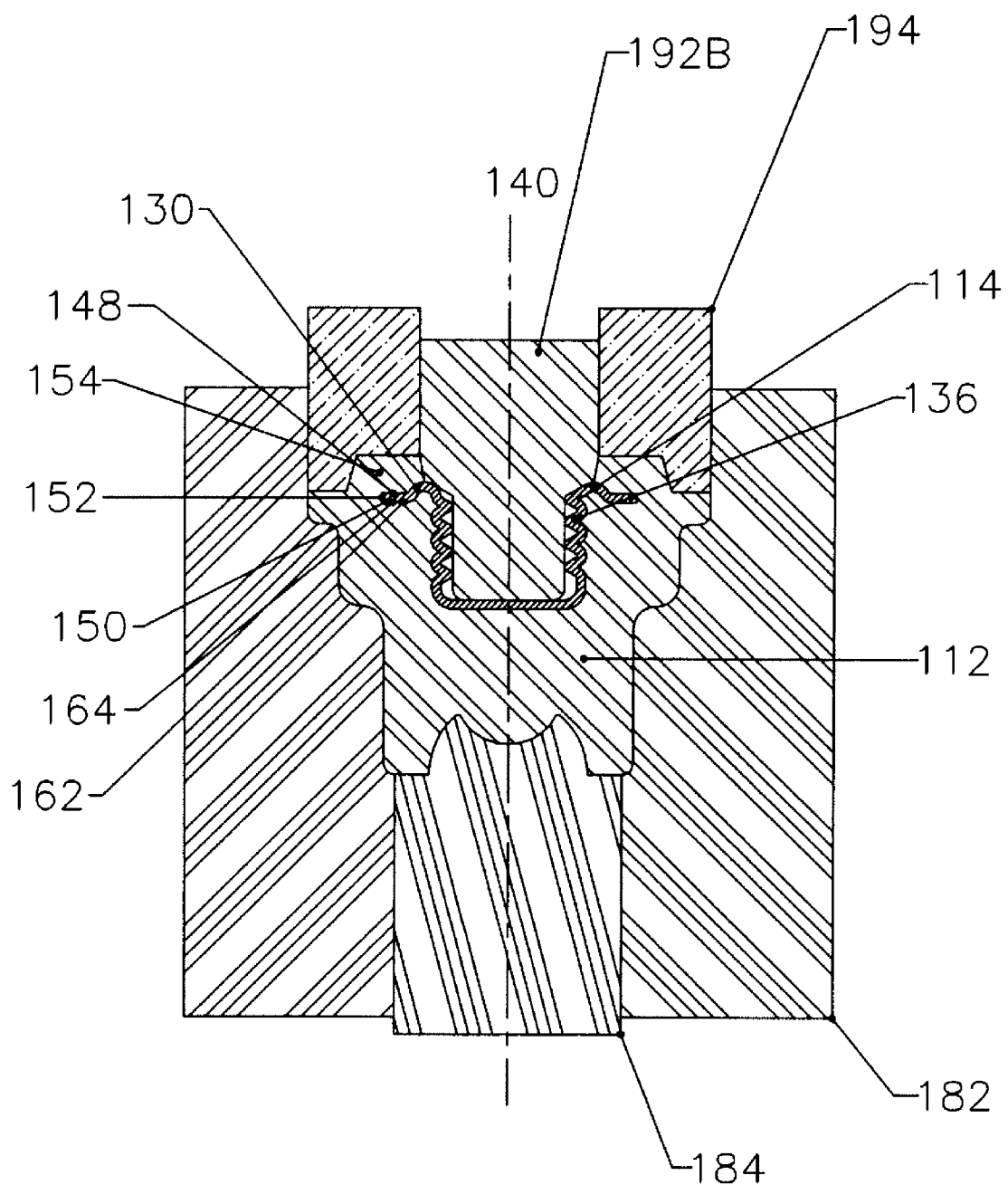
FIG. 4(d) is a cross-sectional view of the battery terminal after the body has been cold formed to confine the insert.
Figure 5A:
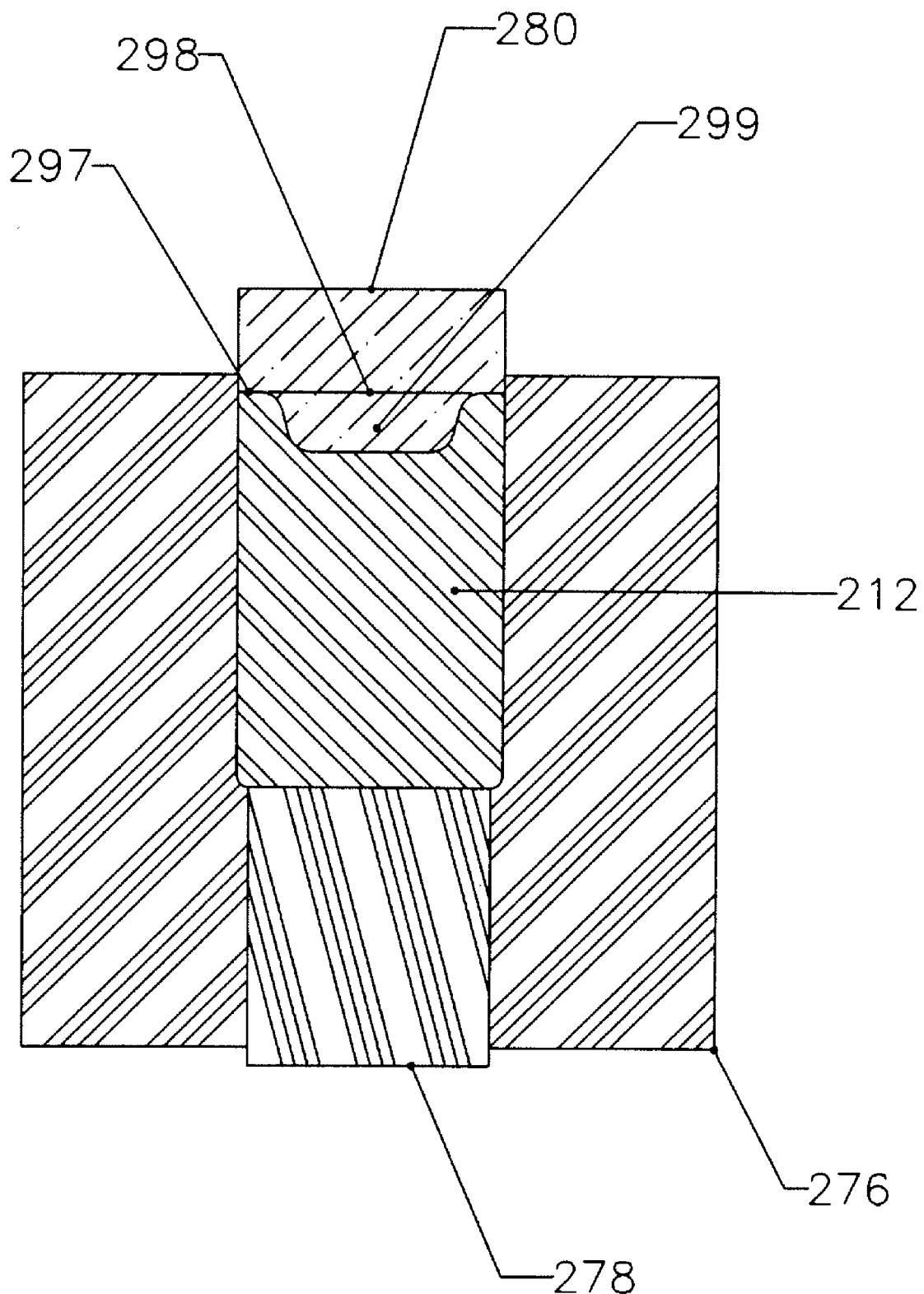
FIG. 5(a) is a cross-sectional view of the battery terminal after the first forming station.
Figure 5B:
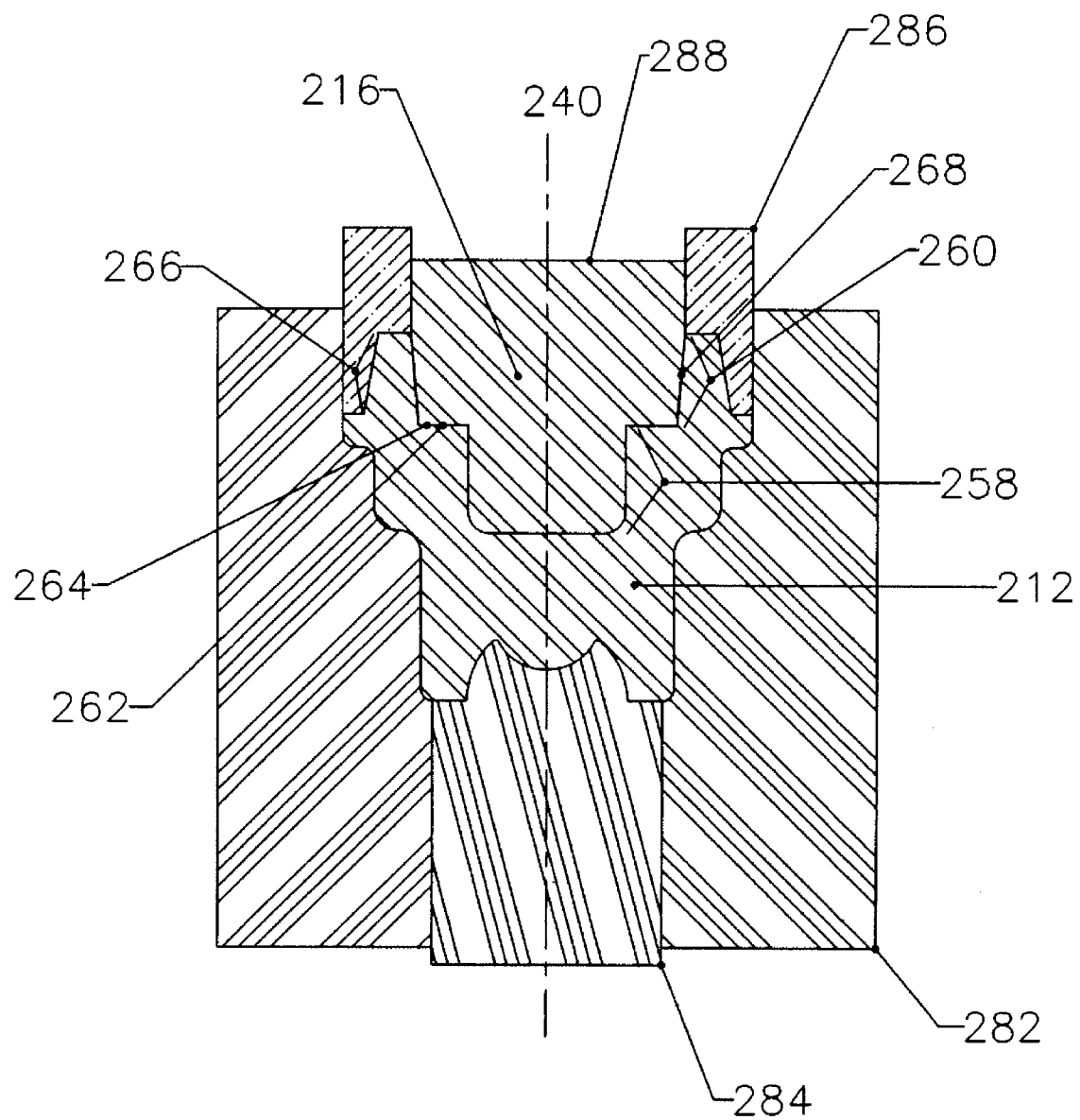
FIG. 5(b) is a cross-sectional view of the battery terminal after the second forming station.
Figure 5C:
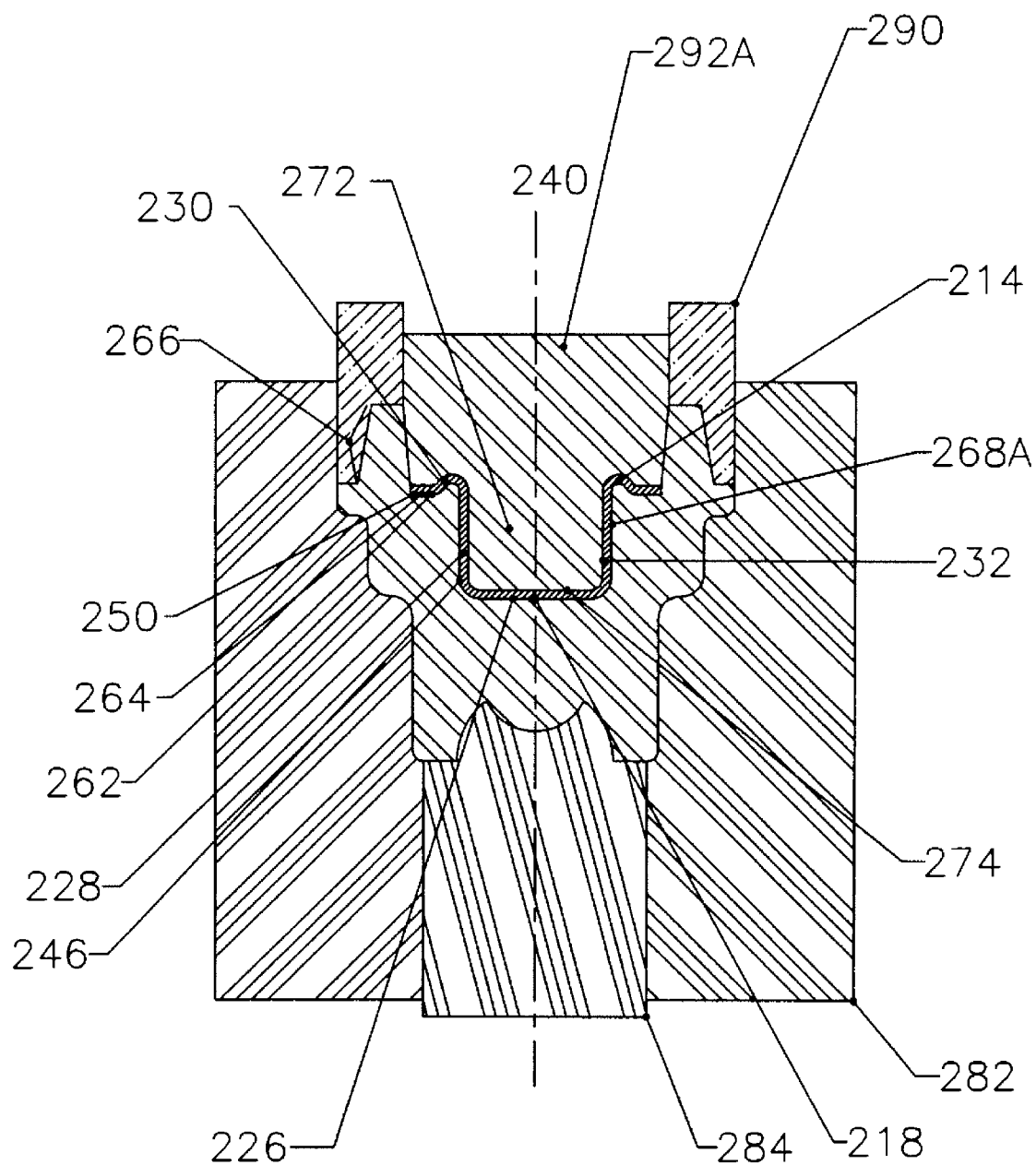
FIG. 5(c) is a cross-sectional view of the battery terminal after the insert has been inserted at the third forming station.
Figure 5D:
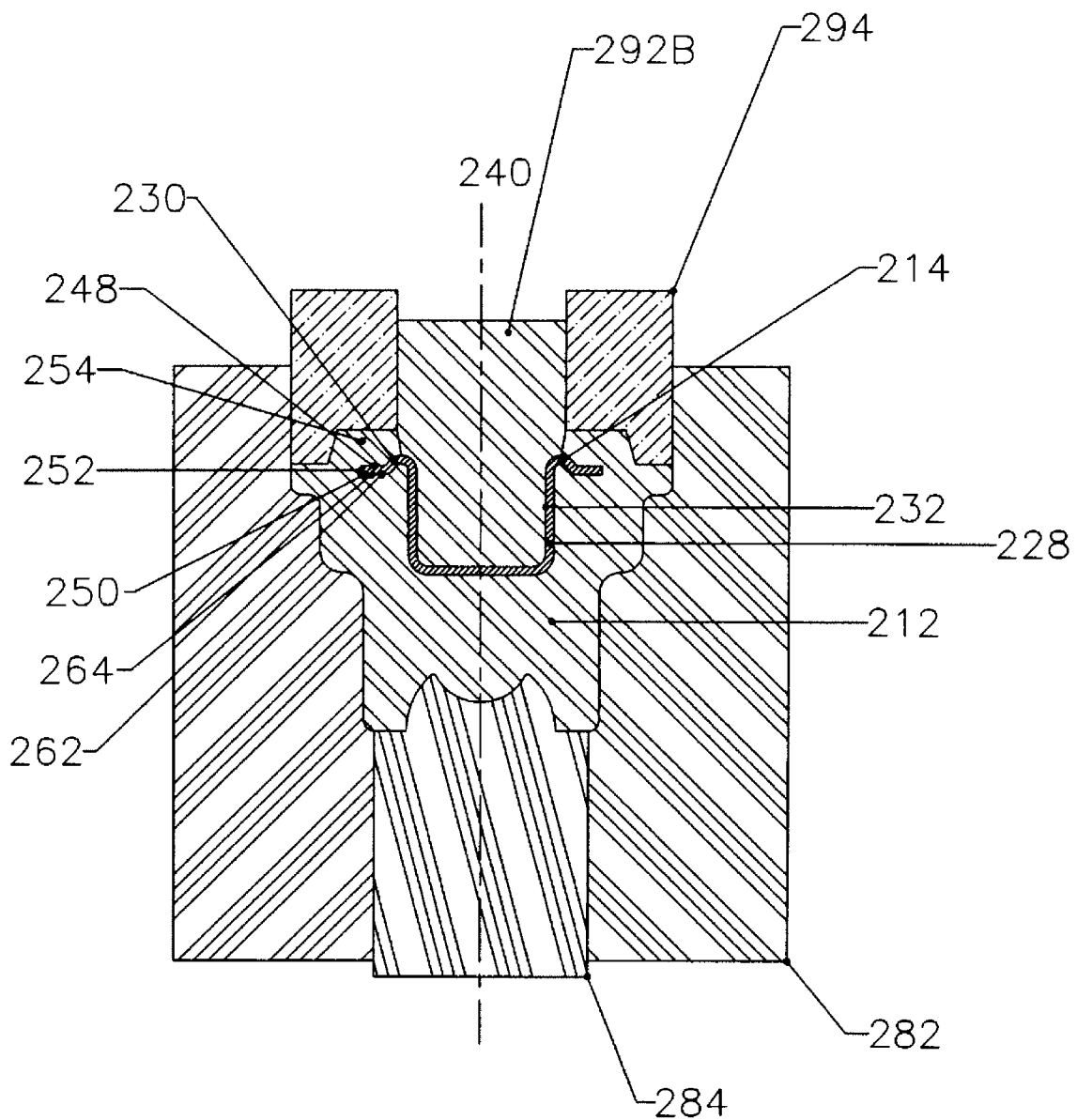
FIG. 5(d) is a cross-sectional view of the battery terminal after the body has been cold formed to confine the insert.
Figure 6A:
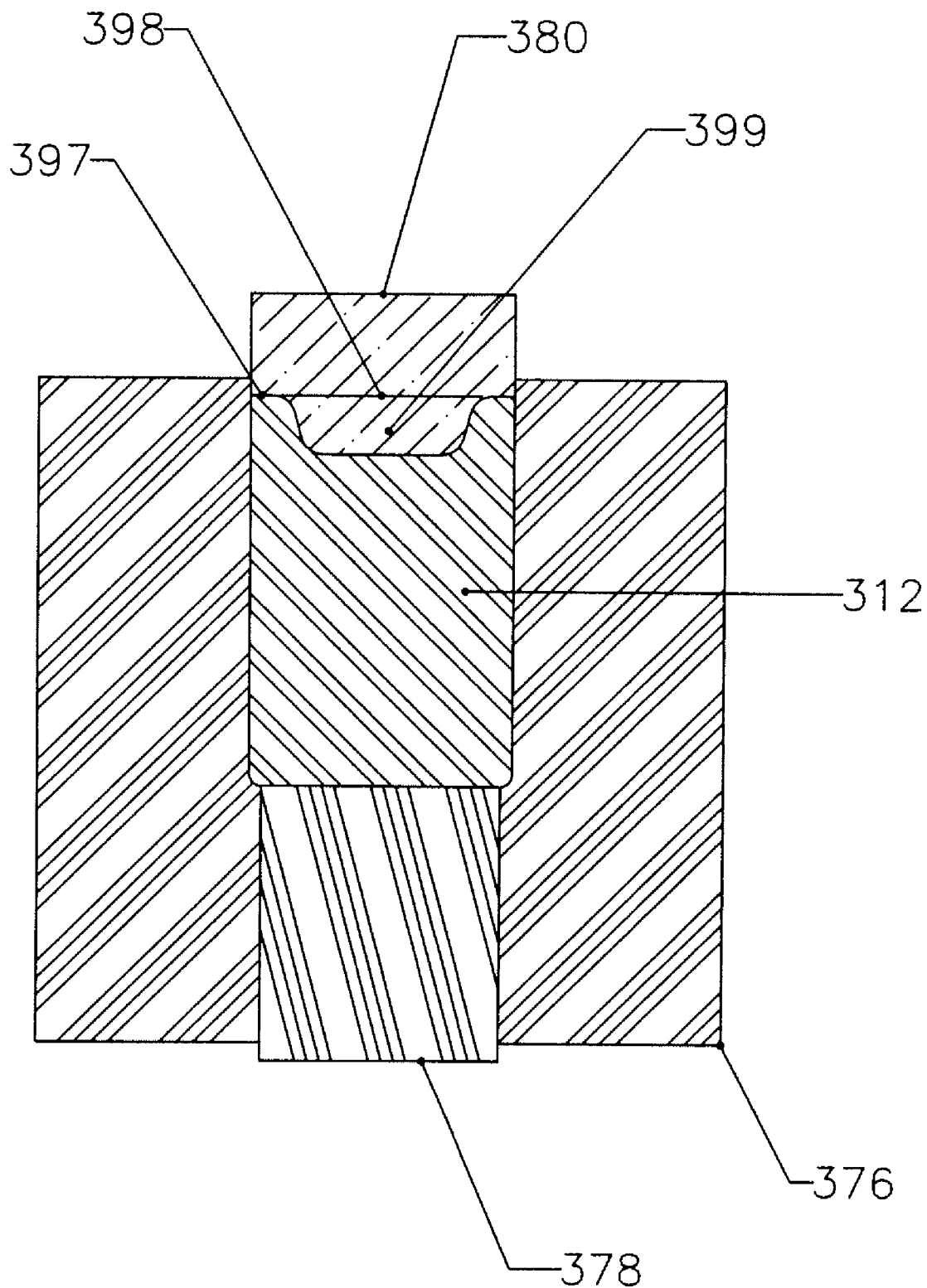
FIG. 6(a) is a cross-sectional view of the battery terminal after the first forming station.
Figure 6B:
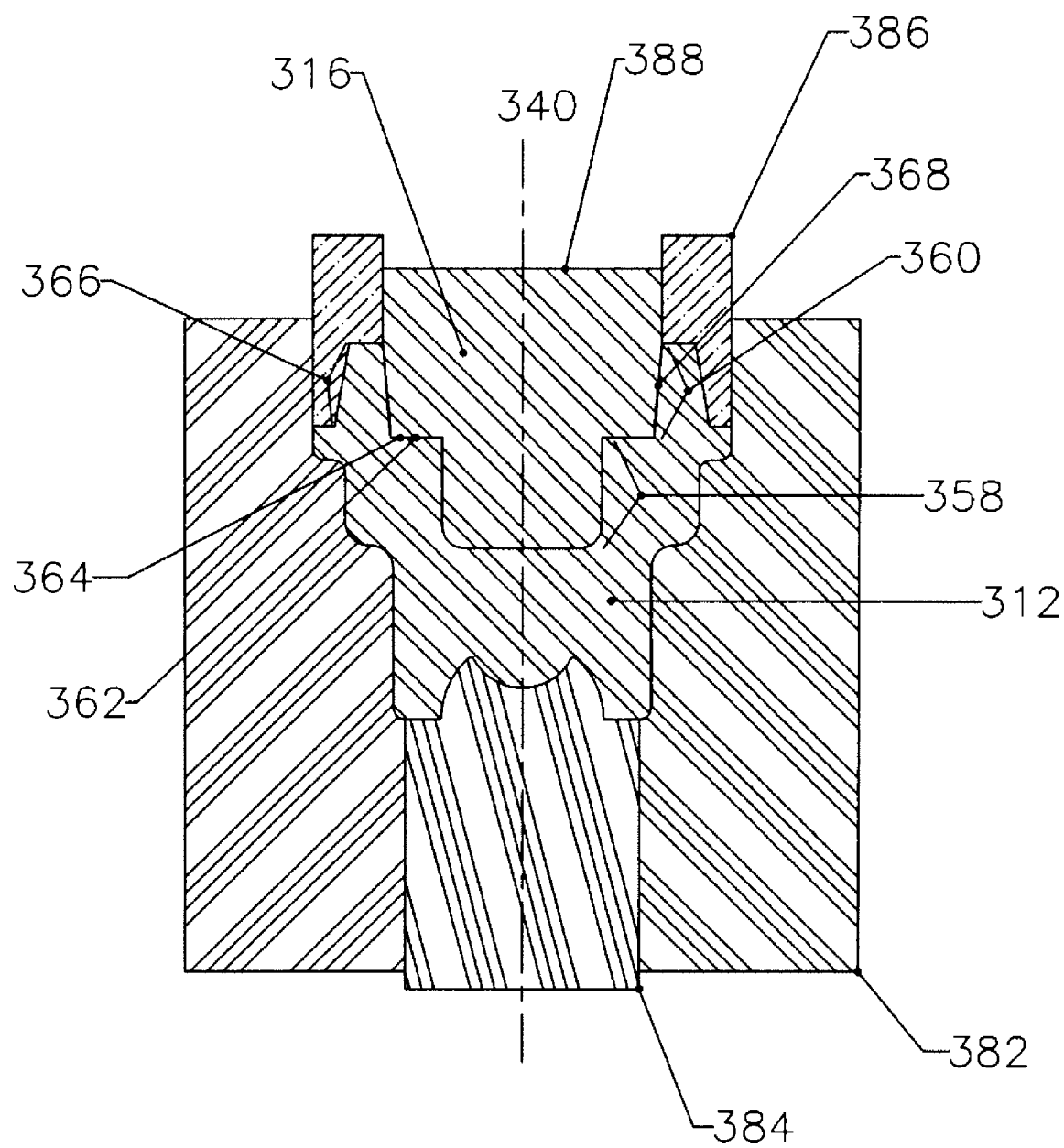
FIG. 6(b) is a cross-sectional view of the battery terminal after the second forming station.
Figure 6C:
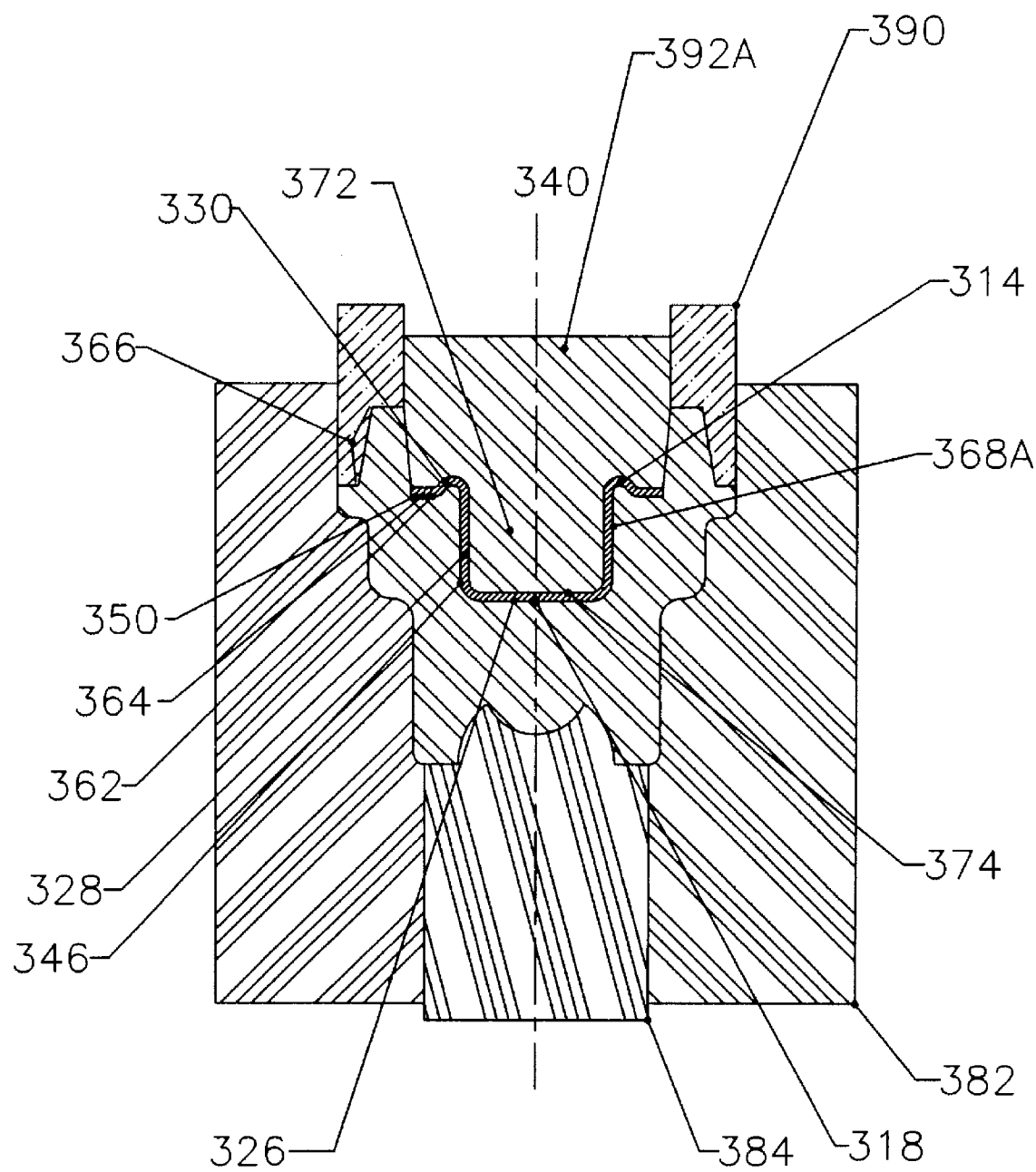
FIG. 6(c) is a cross-sectional view of the battery terminal after the insert has been inserted at the third forming station.
Figure 6D:
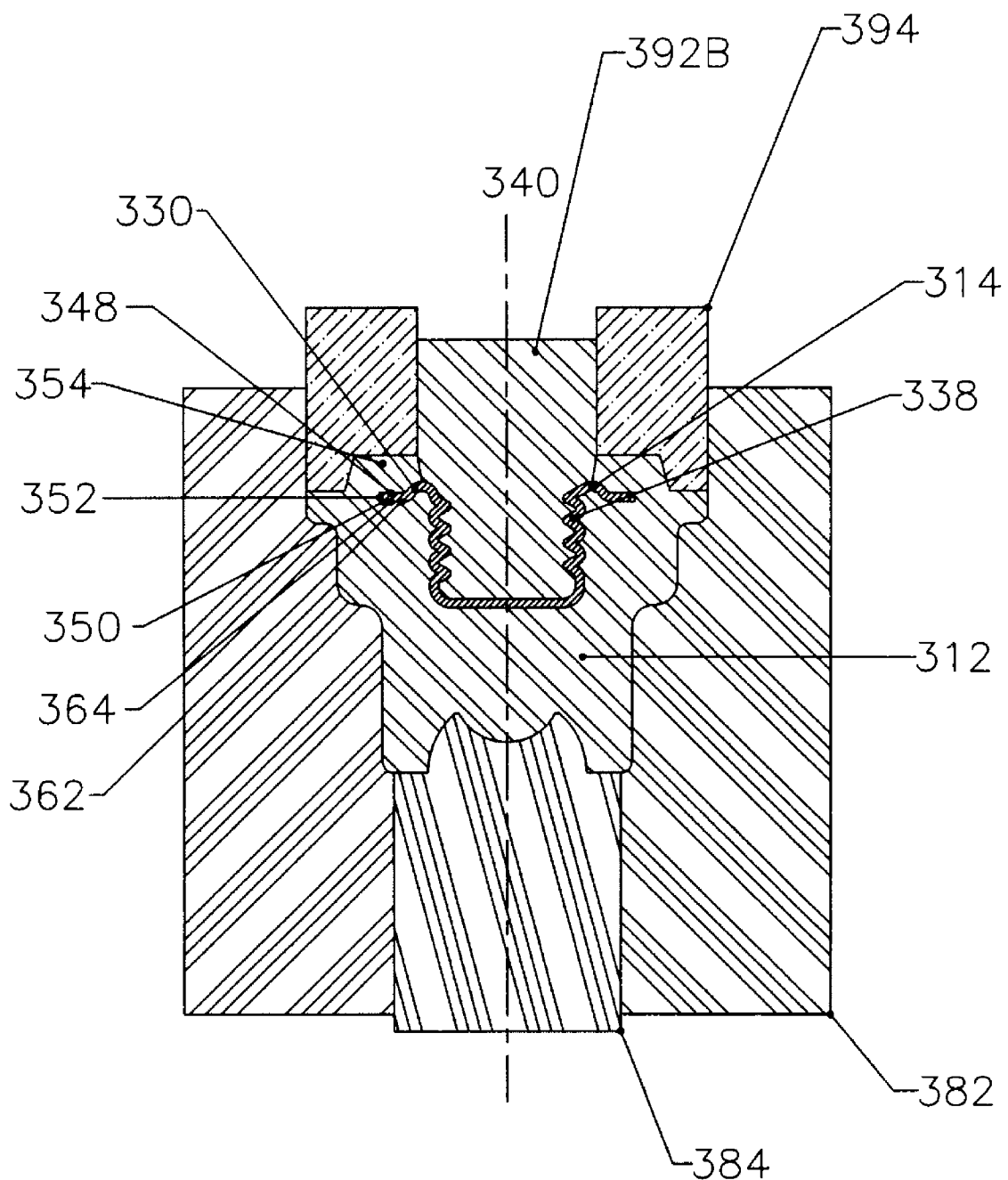
FIG. 6(d) is a cross-sectional view of the battery terminal after the body has been cold formed to confine the insert.
Figure 7A:
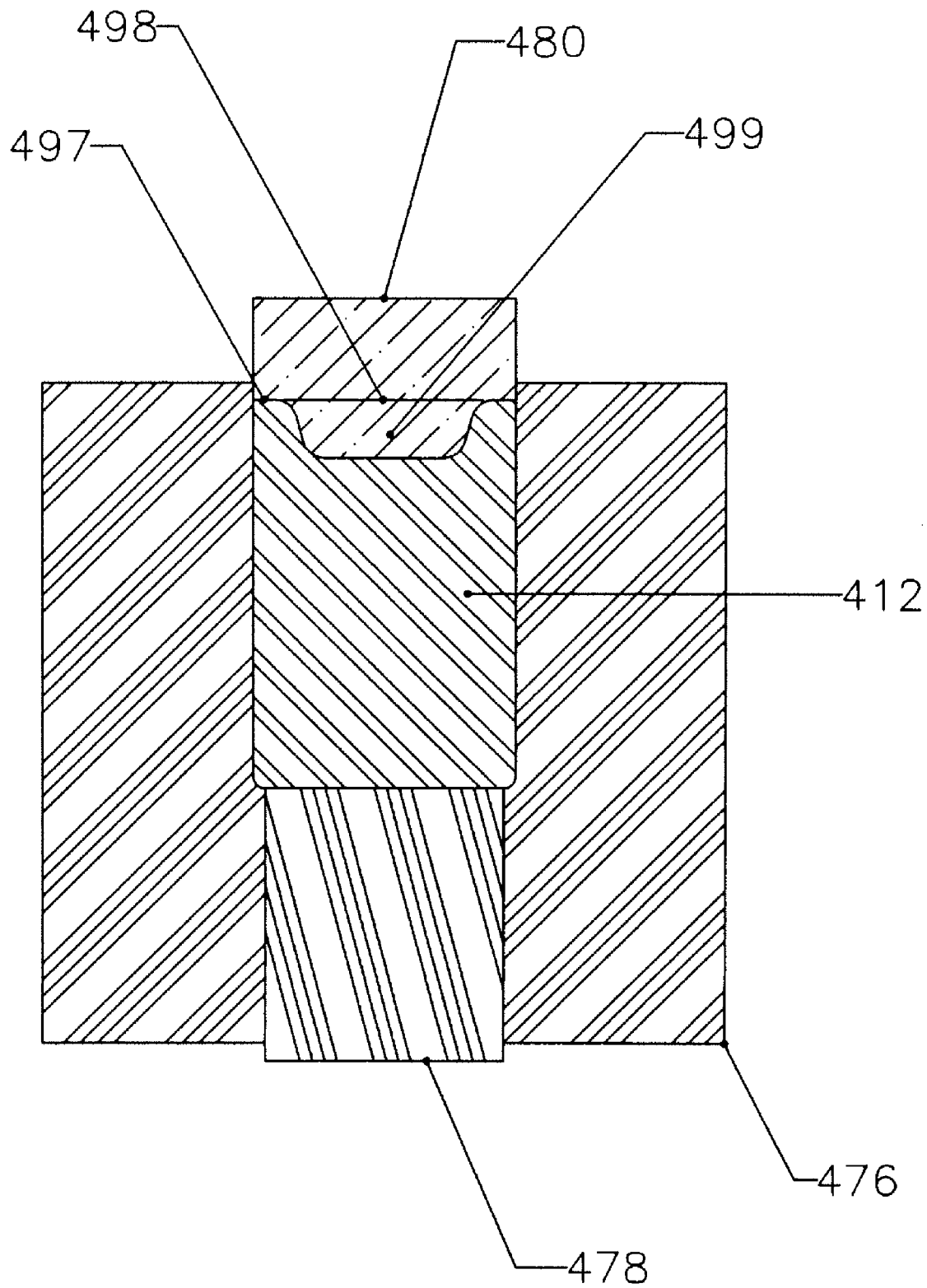
FIG. 7(a) is a cross-sectional view of the battery terminal after the first forming station.
Figure 7B:
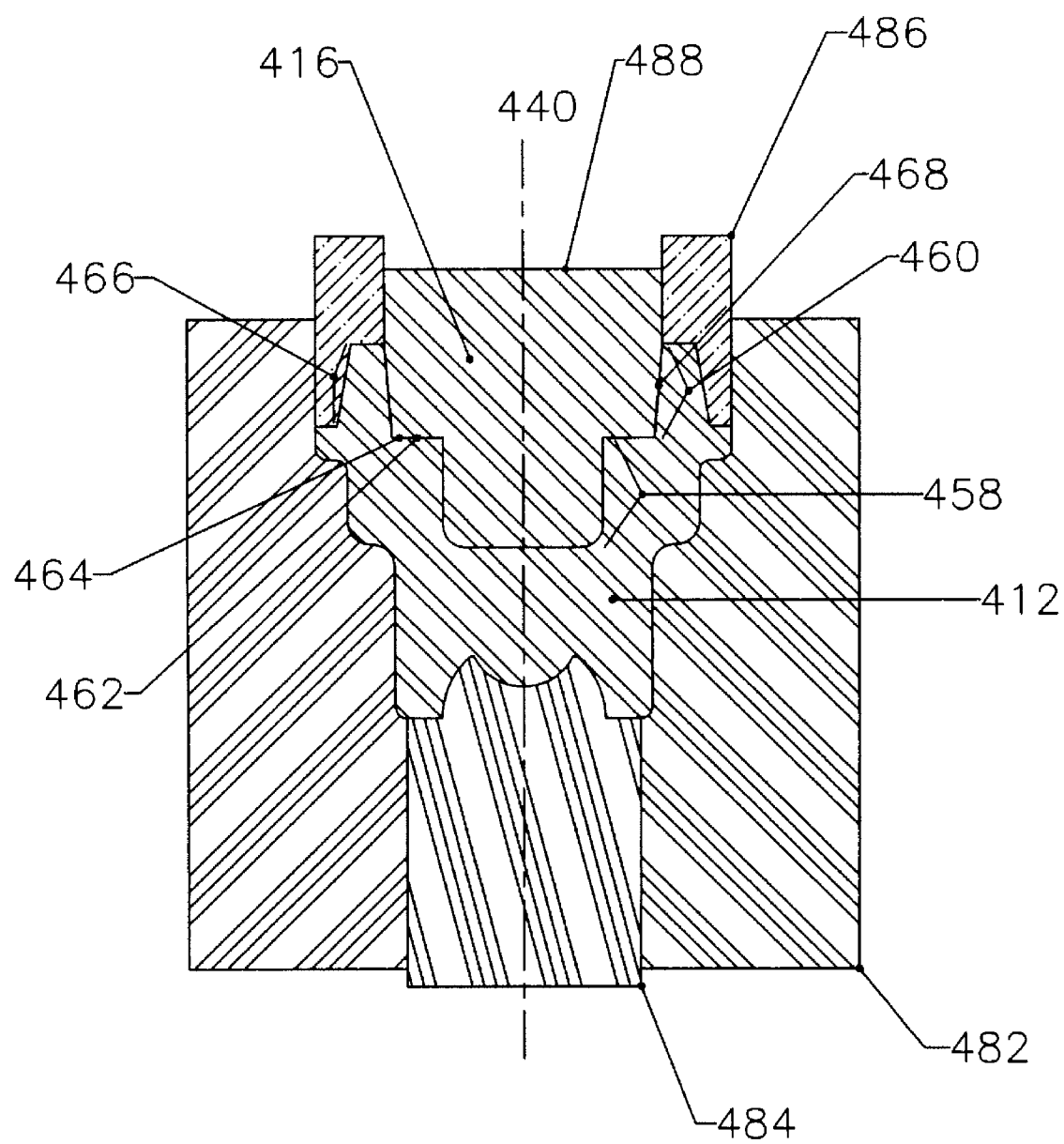
FIG. 7(b) is a cross-sectional view of the battery terminal after the second forming station.
Figure 7C:
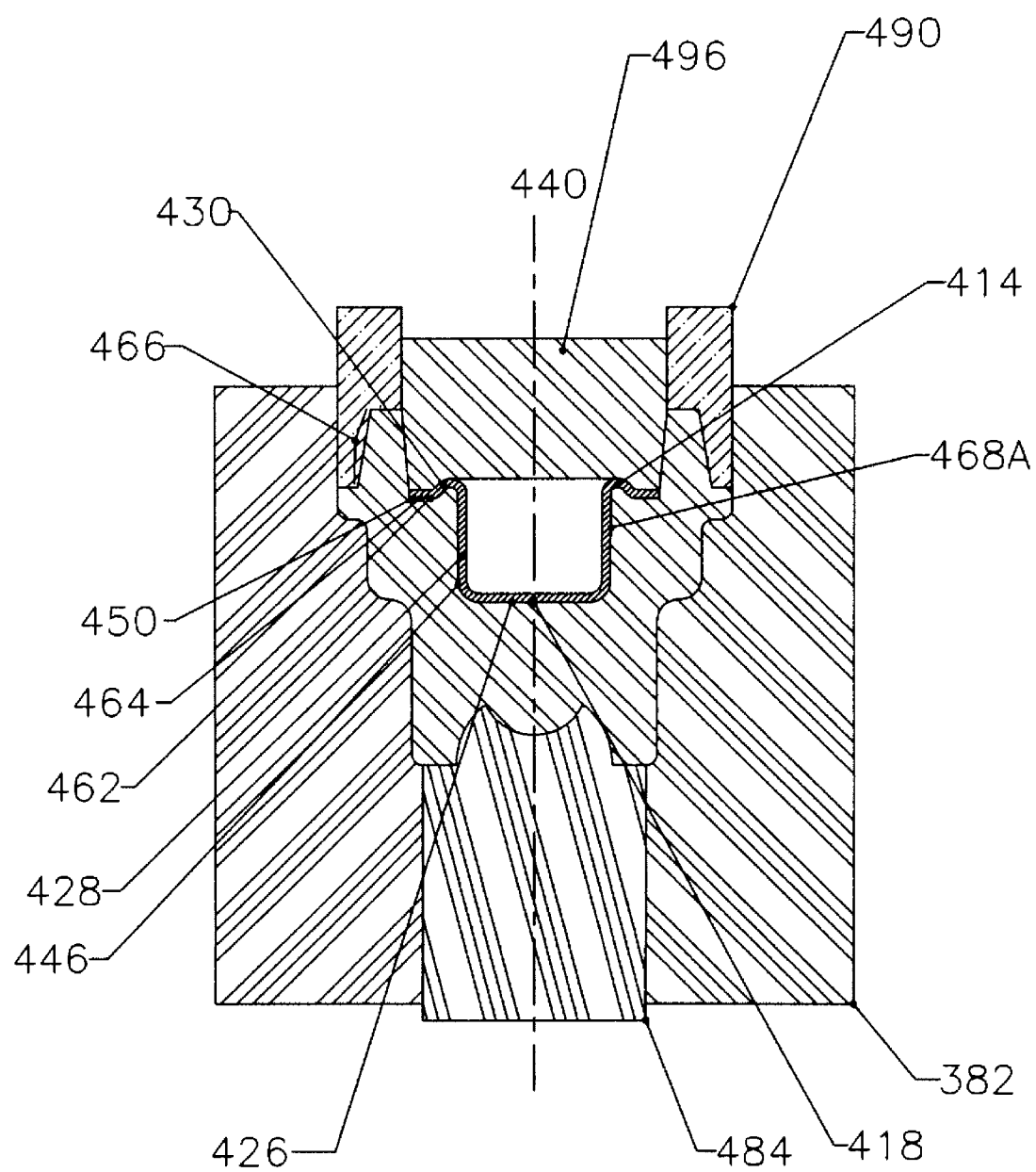
FIG. 7(c) is a cross-sectional view of the battery terminal after the insert has been inserted at the third forming station.
Figure 7D:
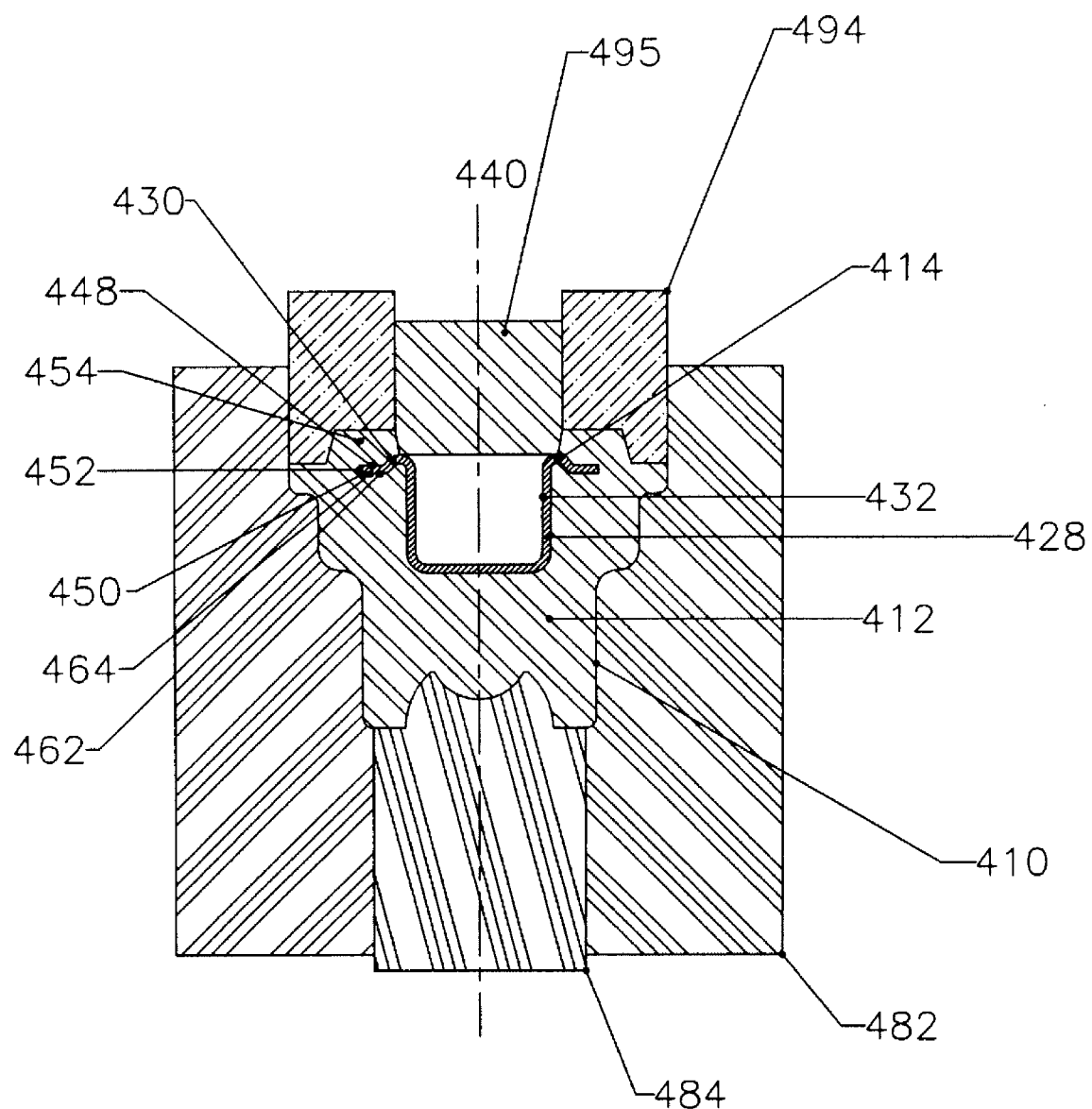
FIG. 7(d) is a cross-sectional view of the battery terminal after the body has been cold formed to confine the insert.
Figure 8A:
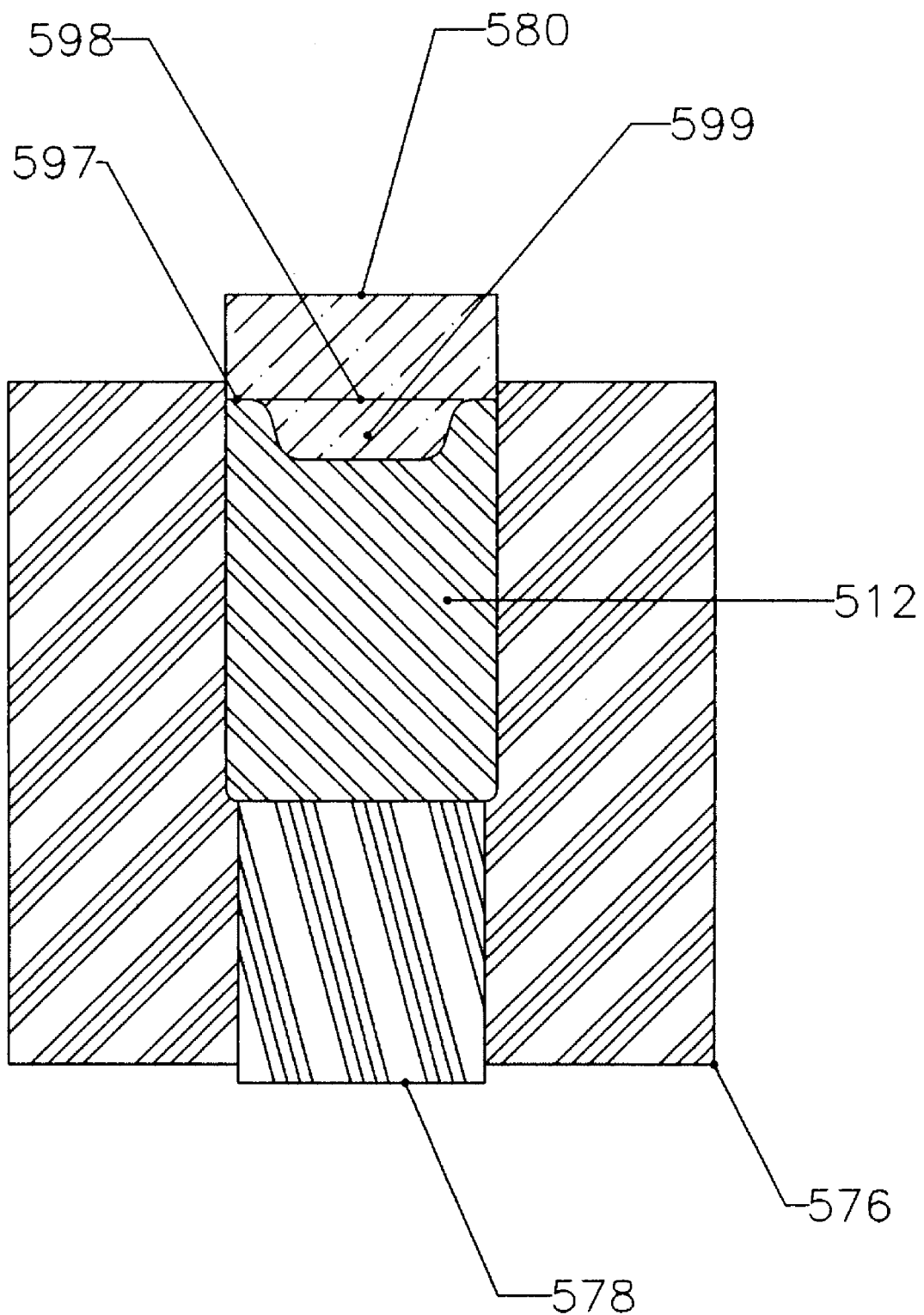
FIG. 8(a) is a cross-sectional view of the battery terminal after the first forming station.
Figure 8B:
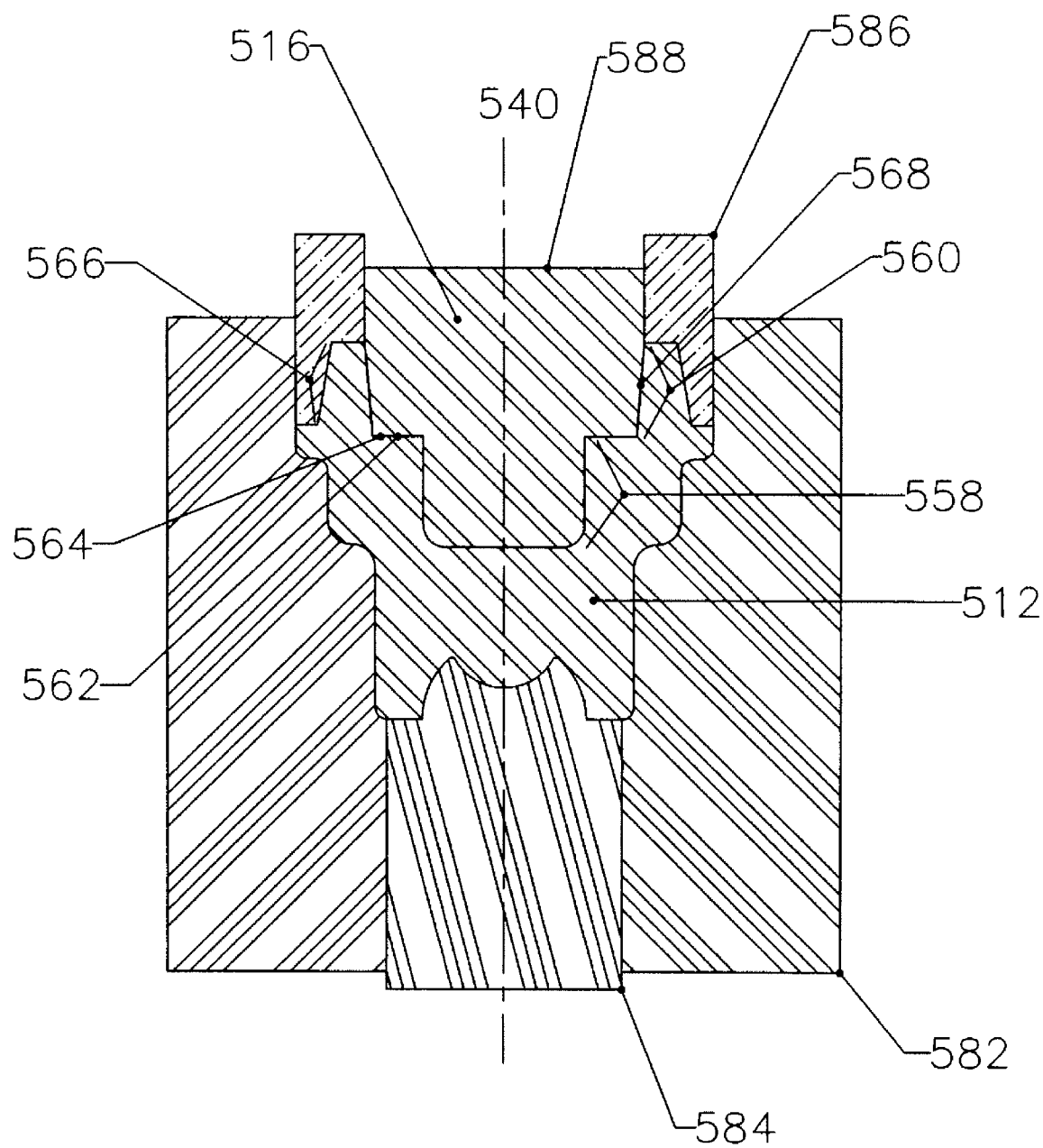
FIG. 8(b) is a cross-sectional view of the battery terminal after the second forming station.
Figure 8C:
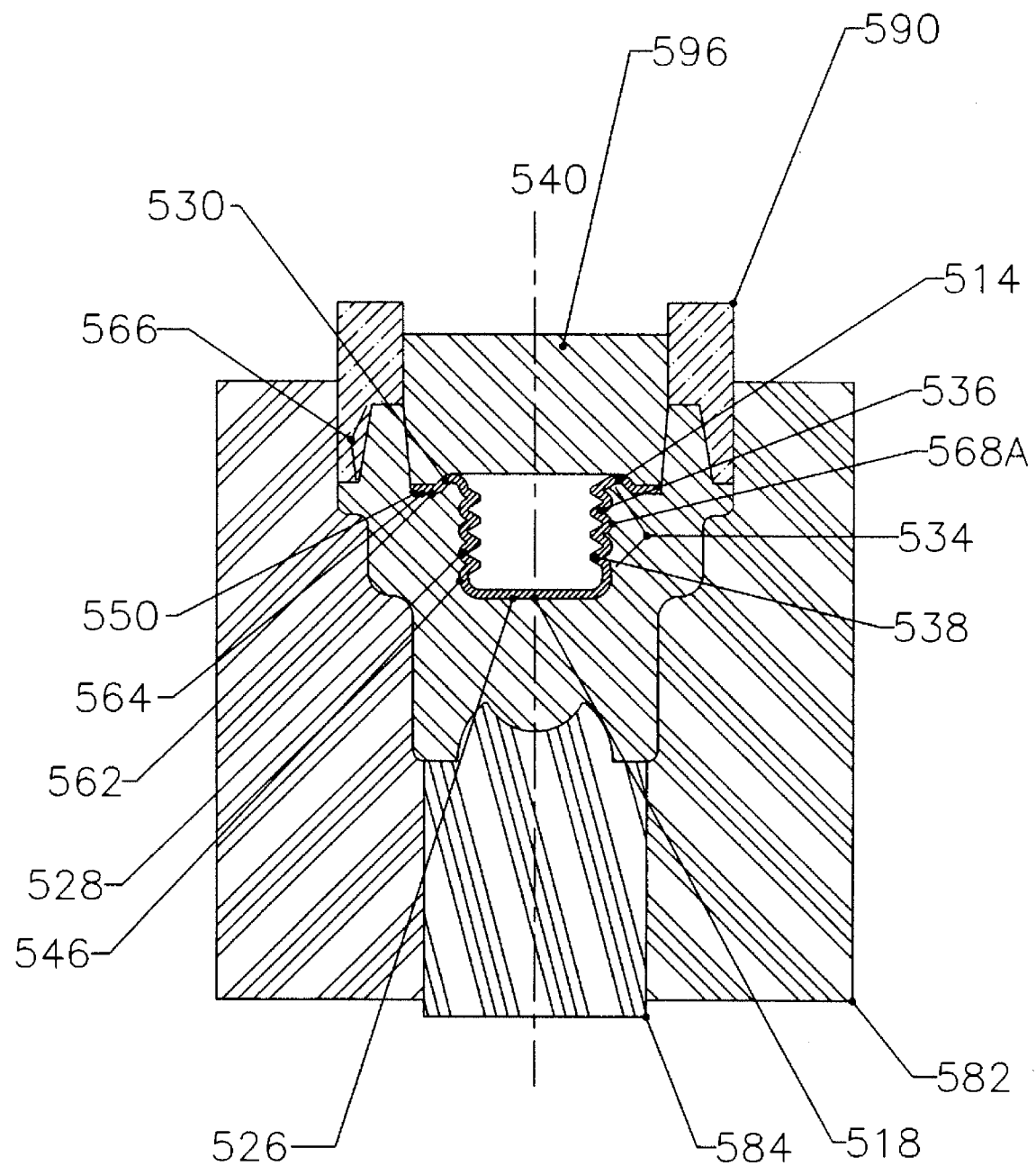
FIG. 8(c) is a cross-sectional view of the battery terminal after the insert has been inserted at the third forming station.
Figure 8D:
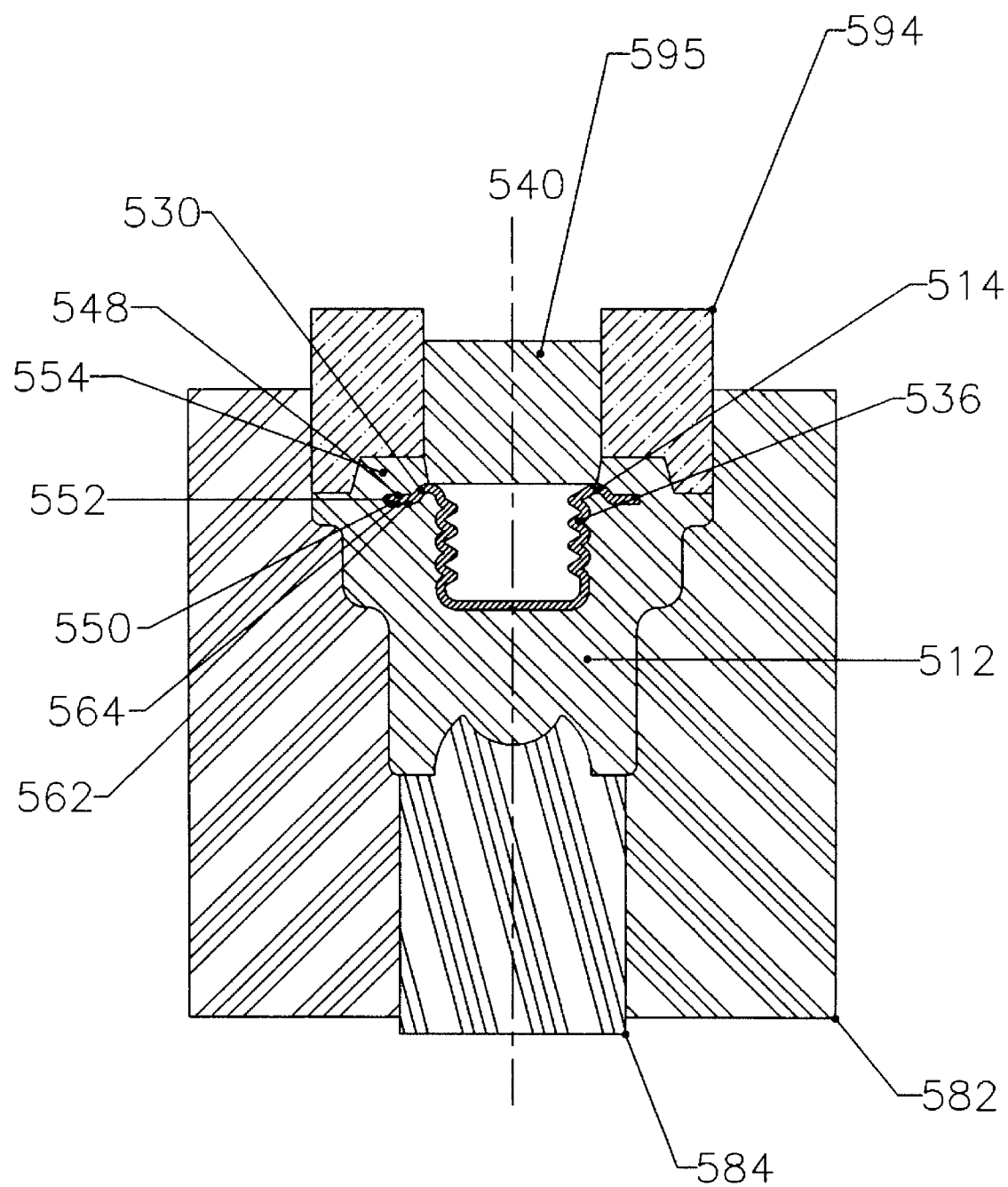
FIG. 8(d) is a cross-sectional view of the battery terminal after the body has been cold formed to confine the insert.

A side wall battery terminal 10 according to a first embodiment of the present invention is shown in FIG. 1(b). Terminal 10 is formed from a body 12 cold formed to confine an insert 14 in a cavity 16. Referring to FIG. 1(a), cavity 16 is defined by a cavity bottom 18, a cavity wall 20 stretching circumferentially about cavity 16, and a cavity mouth 22 proximate a top face 24 of body 12.

Referring to FIG. 2(a), insert 14 includes an insert base 26, at least one insert side wall 28, and at least one flange 30 extending radially outward from insert side wall 28. The insert base 26 is located within cavity 16 proximate cavity bottom 18 as shown in FIG. 1(b). Referring to FIG. 2(c), the insert side wall 28 includes an inside surface 32. The insert 14 also includes at least one threaded region 34 on inside surface 32 of insert side wall 28. Threaded region 34 includes a thread profile 36 marked by the undulations of the threads 38 approaching and retreating from a cavity vertical axis 40. Referring to FIG. 2(d), a minor diameter 42 of insert 14 exists at the smallest diameter within insert side wall 28 defined by the crests 44 of threads 38. Threaded region 34 may be reflected on outside surface 46 of insert side wall 28 such that outside surface 46 includes threads 38 as well. The threads 38 in threaded region 34 need not necessarily be continuous around the circumference of insert side wall 28.

Referring to FIG. 2(a), insert flange 30 includes an upper surface 48, a bottom surface 50, and an outer edge 52. Insert flange 30 is confined by body 12. Referring back to FIG. 1(b), a portion of upper surface 48 of insert flange 30 extending from outer edge 52 toward cavity vertical axis 40 is confined in at least one region extending radially outward form the cavity vertical axis 40 beneath a top tier 54 of body material extending outward from cavity vertical axis 40 beyond outer edge 52 of insert flange 30. Outer edge 52 of insert flange 30 and bottom surface 50 of insert flange 30 are similarly proximate body material. The insert flange 30 is considered confined when rotational motion of insert 14 about cavity vertical axis 40 is sufficiently inhibited and vertical motion of insert 14 relative to body 12 is sufficiently inhibited.

In a preferred embodiment, body 12 is made of lead and insert 14 is a drawn sheet metal insert. The insert 14 may be hat shaped, having a single side wall 28 extending circumferentially around the entire perimeter of a substantially circular insert base 26. Insert flange 30 projects outward from cavity vertical axis 40 from the top of side wall 28 along the entire circumference. However, flange 30 in other embodiments may not extend about the entire circumference and/or may be formed of two or more discontinuous sections. The insert 14 may have anti-rotational features to limit rotation of insert 14 relative to body 12. In FIG. 2(b) anti-rotational features are shown as projections 70. Anti-rotational features may also be recesses, undulations, or other features tending to limit rotational movement.

This concept can be used for different types of battery terminals, including, but not limited to, terminals with acid rings. The battery terminal may be side mount, vertical mount, or top mount. The completed battery terminal 10 is molded into a side wall of a battery casing (not shown). The threaded insert 14 in the terminal provides a means for connecting battery terminal 10 to a battery cable (not shown). In a preferred embodiment, insert 14 is formed from sheet metal.

The methods for manufacturing a preferred battery terminal embodiment involve cold forming body 12 to confine insert 14 within cavity 16. To avoid confusion during discussion of the methods of manufacturing the battery terminal, the battery terminal features will be assigned different numerals during discussion of each different method.

Referring to FIGS. 3(a)-3(d), in one method, at a first form station, body 12 is placed between dies 76 and 78 and cold formed using a punch 80 to define cavity 99 with a cavity mouth 98 on a top face 97 of body 12. In an alternate embodiment, dies 76 and 78 may be combined into a single die. At a second form station body 12 is cold formed to closely resemble the completed terminal. Using a die 82, a die/punch 84, and two punches 86 and 88, cavity 16 is cold formed create a lower cavity portion 58 and an upper cavity portion 60. The cavities are substantially concentric about cavity vertical axis 40, upper cavity portion 60 having a diameter greater than the diameter of lower cavity portion 58. A ledge 62 is thus created where upper cavity portion 60 and lower cavity portion 58 meet. The ledge 62 includes a substantially flat top surface 64 projecting inward toward cavity vertical axis 40 to join the two cavity portions. A band 66 of body material surrounds upper cavity portion 60, extending outward from inner surface of cavity wall 68 of upper cavity portion 60 of body 12.

At a third form station, insert 14 is positioned in cavity 16 using a mandrel 92A. Die 82, punch/mandrel 84, and a punch 90 are also used at form station 3. The insert 14 includes threaded region 34 with threads 38. Mandrel 92A includes a male threaded portion 72 proximate an end region 74. Insert 14 is threadably secured to mandrel 92A prior to being inserted into cavity 16, enabling mandrel 92A to support thread profile 36 of insert 14. While mandrel 92A is used in FIGS. 3(a)-(d), it is intended that other tools (not shown) may be similarly used. After positioning insert 14, bottom surface 50 of flange 30 resides proximate top surface 64 of ledge 62, and insert base 26 resides proximate cavity bottom 18. Flange 30 may extend outward from vertical axis 40 far enough proximate top surface 64 of ledge 62 to come in contact with inner surface of cavity wall 68 of upper cavity portion 60 of body 12. An interference fit between inner surface of cavity wall 68A of lower cavity portion 58 of body 12 and outside surface 46 of insert side wall 28 is used to secure insert 14 in body 12 while being moved during the manufacturing process.

At a forth form station, band 66 is cold formed downward toward top surface 64 of ledge 62 and inward toward cavity vertical axis 40 to confine insert flange 30 along upper surface 48, bottom surface 50, and outer edge 52 using dies 82 and 84, a mandrel 92B, and a punch 94. Insert flange 30 becomes trapped beneath top tier 54 of body material, cold formed from the body material of band 66. Mandrel 92B supports thread profile 36 of insert 14 in the same manner as mandrel 92A at form station 3 during this process.

Referring to FIGS. 4(a)-4(d), in one method, at a first form station, body 112 is placed between dies 176 and 178 and cold formed using a punch 180 to define cavity 199 with a cavity mouth 198 on a top face 197 of body 112. In an alternate embodiment, dies 176 and 178 may be combined into a single die. At a second form station body 112 is cold formed to closely resemble the completed part. Using a die 182, a die/punch 184, and two punches 186 and 188, cavity 116 is cold formed to create a lower cavity portion 158 and an upper cavity portion 160. The cavities are substantially concentric about cavity vertical axis 140, upper cavity portion 160 having a diameter greater than the diameter of lower cavity portion 158. A ledge 162 is thus created where upper cavity portion 160 and lower cavity portion 158 meet. The ledge 162 includes a substantially flat top surface 164 projecting inward toward cavity vertical axis 140 to join the two cavity portions. A band 166 of body material surrounds upper cavity portion 160, extending outward from inner surface of cavity wall 168 of upper cavity portion 160 of body 112.

At a third form station, insert 114 is positioned in cavity 116 using a mandrel 192A. Die 182, punch/mandrel 184, and a punch 190 are also used at form station 3. The insert 114 includes threaded region 134 with threads 138. Mandrel 192A includes a male portion 172 proximate an end region 174. Mandrel 192A is solid and has substantially the same diameter as minor diameter 142 of insert 114. When placed in insert 114, mandrel 192A supports only the minor diameter 142 of the insert 114. While mandrels are used in FIGS. 4(a)-(d), it is intended that other tools (not shown) may be similarly used. After positioning insert 114, bottom surface 150 of flange 130 resides proximate top surface 164 of ledge 162, and insert base 126 resides proximate cavity bottom 118.

Flange 130 may extend outward from vertical axis 140 far enough proximate top surface 164 of ledge 162 to come in contact with inner surface of cavity wall 168 of upper cavity portion 160 of body 112. An interference fit between inner surface of cavity wall 168A of lower cavity portion 158 of body 112 and outside surface 146 of insert side wall 128 is used to secure insert 114 in body 112 while being moved during the manufacturing process.

At a forth form station, band 166 is cold formed downward toward top surface 164 of ledge 162 and inward toward cavity vertical axis 140 to confine insert flange 130 along upper surface 148, bottom surface 150, and outer edge 152 using dies 182 and 184, a mandrel 192B, and a punch 194. Insert flange 130 becomes trapped beneath top tier 154 of body material, cold formed from the body material of band 166. Mandrel 192B supports minor diameter 142 of insert 114 in the same manner as mandrel 192A at form station 3 during this process.

Referring to FIGS. 5(a)-5(d), in one method, at a first form station, body 212 is placed between dies 276 and 278 and cold formed using punch 280 to define cavity 299 with a cavity mouth 298 on a top face 297 of body 212. In an alternate embodiment dies, 276 and 278 may be combined into a single die. At a second form station body 212 is cold formed to closely resemble the completed part. Using a die 282, a die/punch 284, and two punches 286 and 288, cavity 216 is cold formed to create a lower cavity portion 258 and an upper cavity portion 260. The cavities are substantially concentric about cavity vertical axis 240, upper cavity portion 260 having a diameter greater than the diameter of lower cavity portion 258. A ledge 262 is thus created where upper cavity portion 260 and lower cavity portion 258 meet. The ledge 262 includes a substantially flat top surface 264 projecting inward toward cavity vertical axis 240 to join the two cavity portions. A band 266 of body material surrounds upper cavity portion 260, extending outward from inner surface of cavity wall 268 of upper cavity portion 260 of body 212.

At a third form station, insert 214 is positioned in cavity 216 using a mandrel 292A. Die 282, punch/mandrel 284, and a punch 290 are also used at form station 3. The insert 214 does not include threaded region with threads Mandrel 292A supports inside surface 232 of insert side walls 228 of insert 214. While mandrels are used in FIGS. 5(a)-(d), it is intended that other tools (not shown) may be similarly used. After positioning insert 214, bottom surface 250 of flange 230 resides proximate top surface 264 of ledge 262, and insert base 226 resides proximate cavity bottom 218. Flange 230 may extend outward from vertical axis 240 far enough proximate top surface 264 of ledge 262 to come in contact with inner surface of cavity wall 268 of upper cavity portion 260 of body 212. An interference fit between inner surface of cavity wall 268A of lower cavity portion 258 of body 212 and outside surface 246 of insert side wall 228 is used to secure insert 214 in body 212 while being moved during the manufacturing process.

At a forth form station, band 266 is cold formed downward toward top surface 264 of ledge 262 and inward toward cavity vertical axis 240 to confine insert flange 230 along upper surface 248, bottom surface 250, and outer edge 252 using dies 282 and 284, a mandrel 292B, and a punch 294. Insert flange 230 becomes trapped beneath top tier 254 of body material, cold formed from the body material of band 266. Mandrel 292B supports inside surface 232 of insert side walls 228 of insert 214 in the same manner as mandrel 292A at form station 3 during this process.

Referring to FIGS. 6(a)-6(d), in one method, at a first form station, body 312 is placed between dies 376 and 378 and cold formed using a punch 380 to define cavity 399 with a cavity mouth 398 on a top face 397 of body 312. In an alternate embodiment, dies 376 and 378 may be combined into a single die. At a second form station body 312 is cold formed to closely resemble the completed part. Using a die 382, a die/punch 384, and two punches 386 and 388, cavity 316 is cold formed to create a lower cavity portion 358 and an upper cavity portion 360. The cavities are substantially concentric about cavity vertical axis 340, upper cavity portion 360 having a diameter greater than the diameter of lower cavity portion 358. A ledge 362 is thus created where upper cavity portion 360 and lower cavity portion 358 meet. The ledge 362 includes a substantially flat top surface 364 projecting inward toward cavity vertical axis 340 to join the two cavity portions. A band 366 of body material surrounds upper cavity portion 360, extending outward from inner surface of cavity wall 368 of upper cavity portion 360 of body 312.

At a third form station, insert 314 is positioned in cavity 316 using a mandrel 392A. Die 382, punch/mandrel 384, and a punch 390 are also used at form station 3. The insert 314 does not include a threaded region with threads. Mandrel 392A includes a male portion 372 proximate an end region 374. Insert 314 is placed on male portion 372 of mandrel 370 prior to being inserted into cavity 316. While mandrels are used in FIGS. 6(a)-(d), it is intended that other tools (not shown) may be similarly used. After positioning insert 314, bottom surface 350 of flange 330 resides proximate top surface 364 of ledge 362, and insert base 326 resides proximate cavity bottom 318. Flange 330 may extend outward from vertical axis 340 far enough proximate top surface 364 of ledge 362 to come in contact with inner surface of cavity wall 368 of upper cavity portion 360 of body 312. An interference fit between inner surface of cavity wall 368A of lower cavity portion 358 of body 312 and outside surface 346 of insert side wall 328 is used to secure insert 314 in body 312 while being moved during the manufacturing process.

At a forth form station, band 366 is cold formed downward toward top surface 364 of ledge 362 and inward toward cavity vertical axis 340 to confine insert flange 330 along upper surface 348, bottom surface 350, and outer edge 352 using dies 382 and 384, a mandrel 392B, and a punch 394. Insert flange 330 becomes trapped beneath top tier 354 of body material, cold formed from the body material of band 366. As body 312 is forged to confine insert 314, the body material forces the insert material to change shape and conform to the shape of the threaded mandrel 392B, creating threads 338.

Referring to FIGS. 7(a)-7(d), in one method, at a first form station, body 412 is placed between dies 476 and 478 and cold formed using a punch 480 to define cavity 499 with a cavity mouth 498 on a top face 497 of body 412. In an alternate embodiment, dies 476 and 478 may be combined into a single die. At a second form station body 412 is cold formed to closely resemble the completed part. Using a die 482, a die/punch 484, and two punches 486 and 488, cavity 416 is cold formed to create a lower cavity portion 458 and an upper cavity portion 460. The cavities are substantially concentric about cavity vertical axis 40, upper cavity portion 460 having a diameter greater than the diameter of lower cavity portion 458. A ledge 462 is thus created where upper cavity portion 460 and lower cavity portion 458 meet. The ledge 462 includes a substantially flat top surface 464 projecting inward toward cavity vertical axis 440 to join the two cavity portions. A band 466 of body material surrounds upper cavity portion 460, extending outward from inner surface of cavity wall 468 of upper cavity portion 460 of body 412.

At a third form station, insert 414 is positioned in cavity 416 using a tool 496. Die 482, punch/mandrel 484, and a punch 490 are also used at form station 3. The insert 414 does not include a threaded region with threads. After positioning insert 414, bottom surface 450 of flange 430 resides proximate top surface 464 of ledge 462, and insert base 426 resides proximate cavity bottom 418. Flange 430 may extend outward from vertical axis 440 far enough proximate top surface 462 of ledge 464 to come in contact with inner surface of cavity wall 468 of upper cavity portion 460 of body 412. An interference fit between inner surface of cavity wall 468A of lower cavity portion 458 of body 412 and outside surface 446 of insert side wall 428 is used to secure insert 414 in body 412 while being moved during the manufacturing process.

At a forth form station, band 466 is cold formed downward toward top surface 464 of ledge 462 and inward toward cavity vertical axis 440 to confine insert flange 430 along upper surface 448, bottom surface 450, and outer edge 452 using dies 482 and 484, and punches 494, 495. Insert flange 430 becomes trapped beneath top tier 454 of body material, cold formed from the body material of band 466.

After form station four, threads (not shown) will be formed on inside surface 432 of insert side wall 428, now confined in body 412 of battery terminal 410, using a secondary operation.

Referring to FIGS. 8(a)-8(d), in one method, at a first form station, body 512 is placed between dies 576 and 578 and cold formed using a punch 580 to define cavity 599 with a cavity mouth 598 on a top face 597 of body 512. In an alternate embodiment, dies 576 and 578 may be combined into a single die. At a second form station body 512 is cold formed to closely resemble the completed part. Using a die 582, a die/punch 584, and two punches 586 and 588, cavity 516 is cold formed to create a lower cavity portion 558 and an upper cavity portion 560. The cavities are substantially concentric about cavity vertical axis 540, upper cavity portion 560 having a diameter greater than the diameter of lower cavity portion 558. A ledge 562 is thus created where upper cavity portion 560 and lower cavity portion 558 meet. The ledge 562 includes a substantially flat top surface 564 projecting inward toward cavity vertical axis 540 to join the two cavity portions. A band 566 of body material surrounds upper cavity portion 560, extending outward from inner surface of cavity wall 568 of upper cavity portion 560 of body 512.

At a third form station, insert 514 is positioned in cavity 516 using a tool 596. Die 582, punch/mandrel 584, and a punch 590 are also used at form station 3. The insert 514 includes threaded region 534 with threads 538. After positioning insert 514, bottom surface 550 of flange 530 resides proximate top surface 564 of ledge 562, and insert base 526 resides proximate cavity bottom 518. Flange 530 may extend outward from vertical axis 540 far enough proximate top surface 564 of ledge 562 to come in contact with inner surface of cavity wall 568 of upper cavity portion 560 of body 512. An interference fit between inner surface of cavity wall 568A of lower cavity portion 558 of body 512 and outside surface 546 of insert side wall 528 is used to secure insert 514 in body 512 while being moved during the manufacturing process.

At a forth form station, band 566 is cold formed downward toward top surface 564 of ledge 562 and inward toward cavity vertical axis 540 to confine insert flange 530 along upper surface 548, bottom surface 550, and outer edge 552 using dies 582 and 584, and punches 594, 595. Insert flange 530 becomes trapped beneath top tier 554 of body material, formed from the body material of band 566.

Note that the above-described methods can be executed to produce battery terminals using 2 or 3 form stations, rather than four. For instance, the processes performed in form stations 1 and 2, as described above, can be combined to be executed in a single station. The steps detailed in the methods discussion of form stations 1-4, or combinations thereof, may also be used in the form of a progressive die.

Thus, it should be apparent that there has been provided in accordance with the present invention a side wall electrical battery terminal that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A cold formed battery terminal comprising a body defining a cavity having a cavity bottom at one end and an opposing upper portion, the body further including a ledge extending radially outward from the cavity proximate the upper portion, an insert formed of a material different than the body positioned in the cavity, the insert comprising a base being proximate the cavity bottom, at least one side wall having an inside surface and an opposing outside surface, and at least one flange extending radially outward from the outer surface of the side wall, the flange being confined by the body along an upper surface, a bottom surface, and an outer edge of the flange, the bottom surface of the flange being adjacent the ledge, the upper surface of the flange and outer edge of the flange being adjacent to and confined by a top tier of the body.

2. The terminal of claim 1, wherein the battery terminal is a side wall battery terminal.

3. The terminal of claim 1, wherein the insert side wall extends into the cavity from its base.

4. The terminal of claim 1, wherein the body has at least one region extending radially outward from the vertical axis of the cavity.

5. The terminal of claim 4, wherein the insert flange is substantially confined within the region in the body or otherwise substantially confined within the body hereby preventing rotational or axial movement of the insert within the body.

6. The terminal of claim 1, wherein the insert is formed sheet metal component.

7. The terminal of claim 1, wherein the insert is formed of a non-corrosive material and the insert base is integrally formed with the insert side wall as a single unit thereby the insert base prohibiting a threaded connecter from being threaded through the insert base into the body of the terminal.

8. The terminal of claim 1, wherein the inside surface of the insert side wall includes at least one threaded region having a thread profile marked by the undulations of the threads in the threaded region.

9. The terminal of claim 8, wherein the undulation of the threaded region are present on the outside surface of the insert side wall as well.

10. The terminal of claim 9, wherein the cavity has undulations corresponding to the undulations of the threaded region of the insert.

11. The terminal of claim 9, wherein the threaded region is such that the region creates interference with the body limiting vertical and rotational motion of the insert relative to the body.

12. The terminal of claim 1, wherein the insert includes anti-rotational features.

13. The terminal of claim 12, wherein the anti-rotational features consist of recesses on the flange of the insert.

14. The terminal of claim 12, wherein the anti-rotational features consist of projections on the flange of the insert.

15. The terminal of claim 12, wherein the anti-rotational features consist of undulations on the flange of the insert.

16. A method for cold forming a battery terminal and confining an insert therein, comprising:
- Cold forming the body such that the cavity has a lower cavity portion and an upper cavity portion, the upper cavity portion having a diameter greater than the diameter of the lower cavity portion, the two cavity portions forming a ledge having a top surface where they meet and forming a band of body material about the upper portion of the cavity;
- Providing an insert formed of a material different than the body including a base, at least one side wall extending upward, and at least one flange extending radially outward from the side wall;
- Positioning the insert into the cavity such that the flange is proximate the top surface of the ledge and the insert base is proximate the cavity bottom;
- and cold forming the band so to confine the flange of the insert within the body along an upper surface, a bottom surface, and an outer edge, creating a layer or top tier of body material about the flange.

17. The method according to claim 16, including the step of cold forming a cavity at one end of a body before cold forming the body such that the cavity has the lower cavity portion and the upper cavity portion.

18. The method according to claim 16, including the step of inserting a mandrel into the insert to position the insert in the cavity.

19. The method according to claim 16, including the step of inserting a mandrel into the insert after the insert is positioned in the cavity but before the insert has been confined in the body.

20. The method according to 18, wherein the insert includes at least one threaded region prior to being positioned in the cavity.

21. The method according to 19, wherein the insert includes at least one threaded region prior to being positioned in the cavity.

22. The method according to claim 20, wherein the mandrel supports only the minor diameter of the threads of the threaded region of the insert.

23. The method according to claim 21, wherein the mandrel supports only the minor diameter of the threads of the threaded region of the insert.

24. The method according to claim 20, wherein the mandrel supports the entire profile of the threads of the threaded region of the insert.

25. The method according to claim 21, wherein the mandrel supports the entire profile of the threads of the threaded region of the insert.

26. The method according to claim 18, wherein the mandrel is used to form a threaded region on the insert wall as the body is formed to confine the flange within the body.

27. The method according to claim 19, wherein the mandrel is used to form a threaded region on the insert wall as the body is formed to confine the flange within the body.

28. The method according to claim 16, including the step of forming at least one threaded region on the inner surface of the insert walls using a secondary process after the flange has been confined within the body.

* * * * *